United States Patent
Bala et al.

(10) Patent No.: US 11,265,824 B2
(45) Date of Patent: Mar. 1, 2022

(54) UPLINK ASYNCHRONOUS NON-ORTHOGONAL MULTIPLE ACCESS

(71) Applicant: IDAC Holdings, Inc., Wilmington, DE (US)

(72) Inventors: Erdem Bala, East Meadow, NY (US); Janet A. Stern-Berkowitz, Little Neck, NY (US); Afshin Haghighat, Ile-Bizard (CA); Moon-il Lee, Melville, NY (US); Mihaela C. Beluri, Jericho, NY (US); Ananth Kini, East Norriton, PA (US); Rui Yang, Greenlawn, NY (US); Alphan Sahin, Westbury, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 10 days.

(21) Appl. No.: 16/097,723

(22) PCT Filed: May 11, 2017

(86) PCT No.: PCT/US2017/032091
§ 371 (c)(1),
(2) Date: Oct. 30, 2018

(87) PCT Pub. No.: WO2017/197075
PCT Pub. Date: Nov. 16, 2017

(65) Prior Publication Data
US 2020/0396698 A1    Dec. 17, 2020

Related U.S. Application Data

(60) Provisional application No. 62/373,088, filed on Aug. 10, 2016, provisional application No. 62/334,499, filed on May 11, 2016.

(51) Int. Cl.
| | |
|---|---|
| *H04W 52/36* | (2009.01) |
| *H04L 5/00* | (2006.01) |
| *H04W 52/14* | (2009.01) |
| *H04W 52/34* | (2009.01) |
| *H04W 72/04* | (2009.01) |

(52) U.S. Cl.
CPC .......... *H04W 52/36* (2013.01); *H04L 5/0005* (2013.01); *H04W 52/146* (2013.01); *H04W 52/346* (2013.01); *H04W 72/042* (2013.01)

(58) Field of Classification Search
CPC . H04W 52/36; H04W 52/346; H04W 52/146; H04W 72/042; H04L 5/0005
See application file for complete search history.

(56) References Cited

U.S. PATENT DOCUMENTS

| | | | |
|---|---|---|---|
| 8,654,871 | B2 | 2/2014 | Kishigami et al. |
| 9,866,364 | B2 | 1/2018 | Jia et al. |

(Continued)

FOREIGN PATENT DOCUMENTS

| | | |
|---|---|---|
| EP | 3018921 A1 | 5/2016 |
| JP | 2009-111995 A | 5/2009 |

(Continued)

OTHER PUBLICATIONS

3rd Generation Partnership Project (3GPP), R1-1609893, "Considerations on UL Grant-Free Transmissions for Mmtc", InterDigital Communications, 3GPP TSG RAN WG1 Meeting #86bis, Lisbon, Portugal, Oct. 10-14, 2016, pp. 1-3.

(Continued)

*Primary Examiner* — Dady Chery
(74) *Attorney, Agent, or Firm* — Condo Roccia Koptiw LLP

(57) ABSTRACT

Systems, methods, and instrumentalities are disclosed for non-orthogonal multiple access (NOMA), frequency hopping, and power control. NOMA may be applied to asynchronous and/or grant-free transmissions. Transmissions from multiple WTRUs may be performed using the same resources, and may comprise information for correctly identifying and decoding the transmissions. The transmissions may comprise a built-in deterministic sequence to support (Continued)

timing acquisition at a receiver. The transmissions may be distinguished based on respective transmit power used for the transmissions. Such transmit power may be dynamically controlled by applying a randomly selected power offset. The power control may be performed autonomously by a WTRU.

18 Claims, 13 Drawing Sheets

(56) References Cited

U.S. PATENT DOCUMENTS

2015/0358915 A1* 12/2015 Semaan .............. H04W 52/367 370/329
2016/0029239 A1* 1/2016 Sadeghi ................ H04W 24/10 370/252

FOREIGN PATENT DOCUMENTS

| JP | 2013-123158 A | 6/2013 |
|---|---|---|
| JP | 2017-533613 A | 11/2017 |
| WO | WO 2015/002433 A1 | 1/2015 |
| WO | 2015/024056 A1 | 2/2015 |

OTHER PUBLICATIONS

3rd Generation Partnership Project (3GPP), R1-162153, "Overview of Non-Orthogonal Multiple Access for 5G", Huawei, HiSilicon, 3GPP TSG RAN WG1 Meeting #84bis, Busan, Korea, Apr. 11-15, 2016, 8 pages.

3rd Generation Partnership Project (3GPP), R1-163111, "Initial Views and Evaluation Results on Non-Orthogonal Multiple Access for NR Uplink", NTT DoCoMo, Inc., 3GPP TSG RAN WG1 Meeting #84bis, Busan, Korea, Apr. 11-15, 2016, pp. 1-6.

3rd Generation Partnership Project (3GPP), TR 38.913 V0.3.0, "Technical Specification Group Radio Access Network, Study on Scenarios and Requirements for Next Generation Access Technologies (Release 14)", Mar. 2016, 30 pages.

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

Shimamoto et al., "Performance Evaluation of Power Level Division Multiple Access (PDMA) Scheme", UPERCOMM/ICC '92 Discovering a New World of Communications, Chicago, IL, USA, vol. 3, 1992, pp. 1333-1337.

* cited by examiner

UPLINK ASYNCHRONOUS NON-ORTHOGONAL MULTIPLE ACCESS

CROSS-REFERENCE TO RELATED APPLICATIONS

This application is the National Stage entry under 35 U.S.C. § 371 of Patent Cooperation Treaty Application PCT/US2017/032091, filed May 11, 2017, which claims the benefit of provisional U.S. patent application No. 62/334,499, filed May 11, 2016, and provisional U.S. patent application No. 62/373,088, filed Aug. 10, 2016, the disclosures of which are incorporated herein by reference in their entireties.

BACKGROUND

Mobile communications continue to evolve. A fifth generation may be referred to as 5G. In a 5G system, wireless transmit/receive units (WTRUs) may transmit data and/or control information without establishing timing alignment and/or waiting for a grant from a network. Such transmission may create multiple access interference at a receiver since the different WTRUs may transmit using the same time/frequency resources.

SUMMARY

Systems, methods, and instrumentalities associated with controlling uplink transmissions in a wireless transmit/receive unit (WTRU) are disclosed herein. The WTRU may perform an uplink transmission simultaneously with one or more other WTRUs. Transmissions by the WTRUs may be performed using non-orthogonal multiple access (NOMA) techniques. A WTRU may receive a configuration from a network that indicates a set of power offsets to be applied by the WTRU in its uplink operation. The set of power offsets may include a value range. The WTRU may randomly select a power offset, e.g., from the value range to use with an uplink transmission. The power offsets may enable a receiver to distinguish transmissions by different WTRUs, and/or to reduce interference among the transmissions. The uplink transmission may be a grant-free transmission (e.g., the WTRU may perform the transmission without a grant from the network). The entire uplink transmission may be a NOMA transmission, or a part of the uplink transmission may be transmitted using NOMA.

The WTRU may be configured to apply a randomly selected power offset to an entire uplink transmission, or to a part of the uplink transmission. One or more of the following may apply. The WTRU may be configured to apply a randomly selected power offset to a first set of one or more subframes of the transmission but not to a second set of one or more subframes of the transmission. The WTRU may be configured to apply a randomly selected power offset to a first set of one or more slots of the transmission but not to a second set of one or more slots of the transmission, or to apply a randomly selected power offset to a first set of one or more symbols of the transmission but not to a second set of one or more symbols of the transmission. If the uplink transmission has a NOMA part and a non-NOMA part, the WTRU may be configured to apply a randomly selected power offset to the NOMA part and not to the non-NOMA part.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
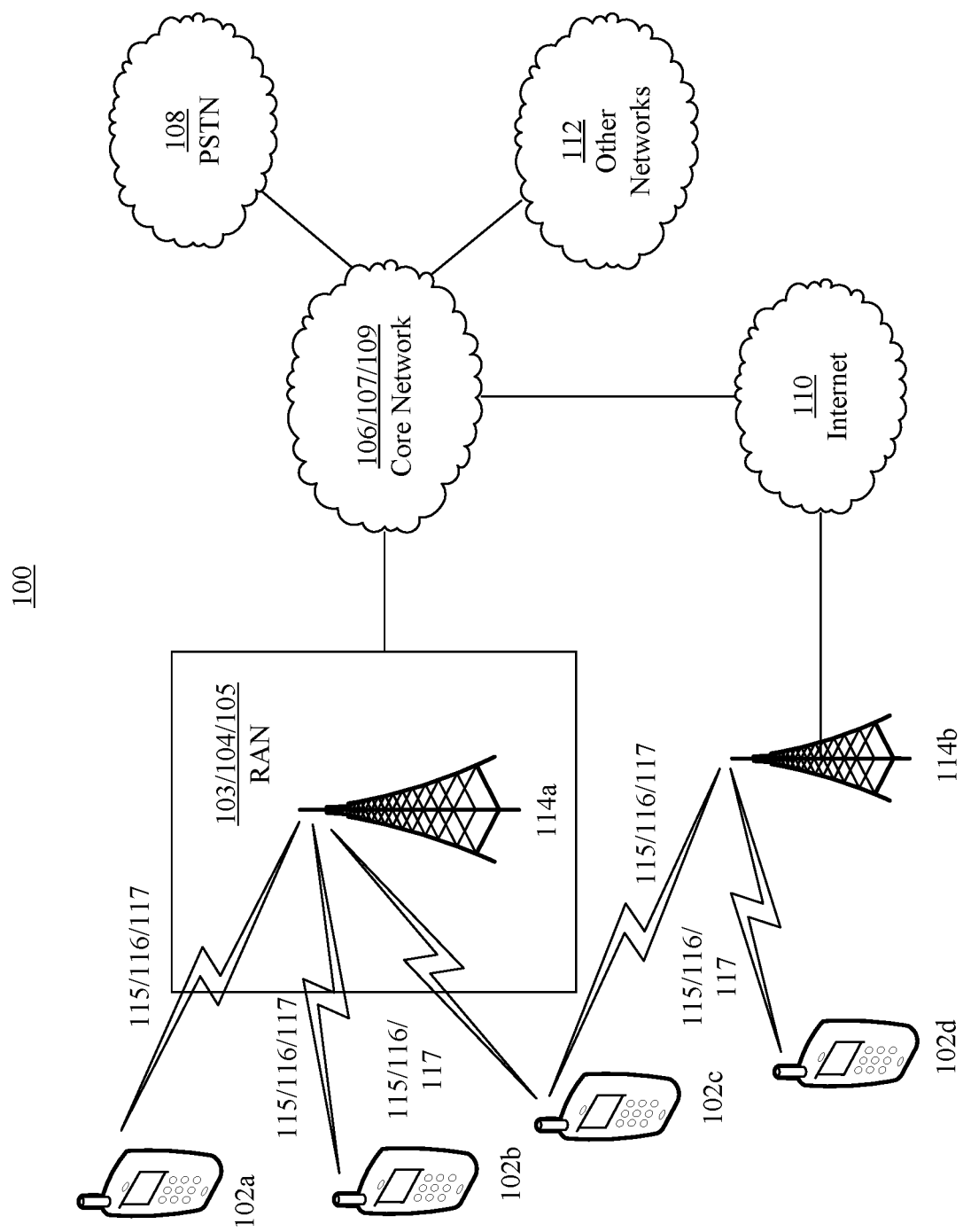
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
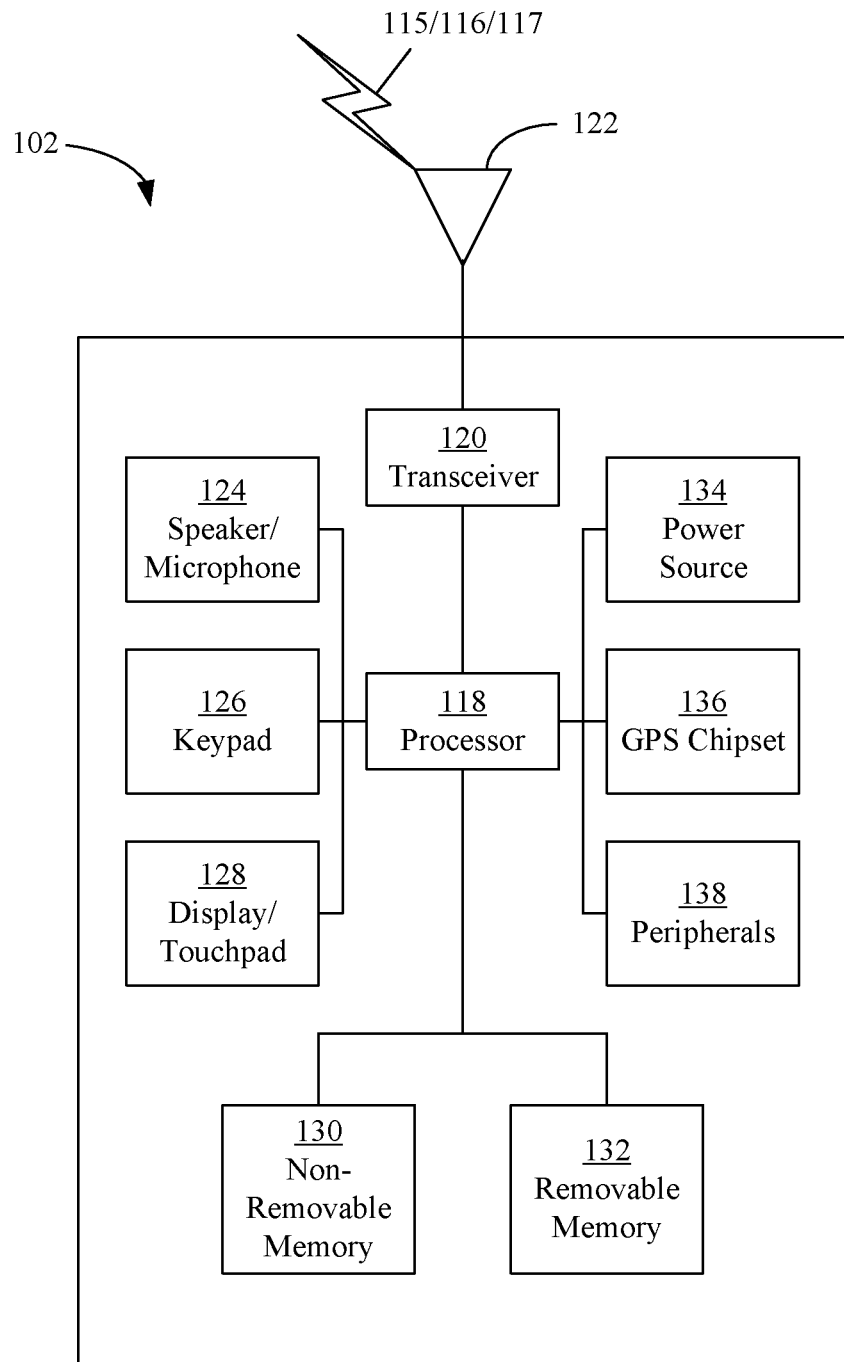
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example. The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit).

The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
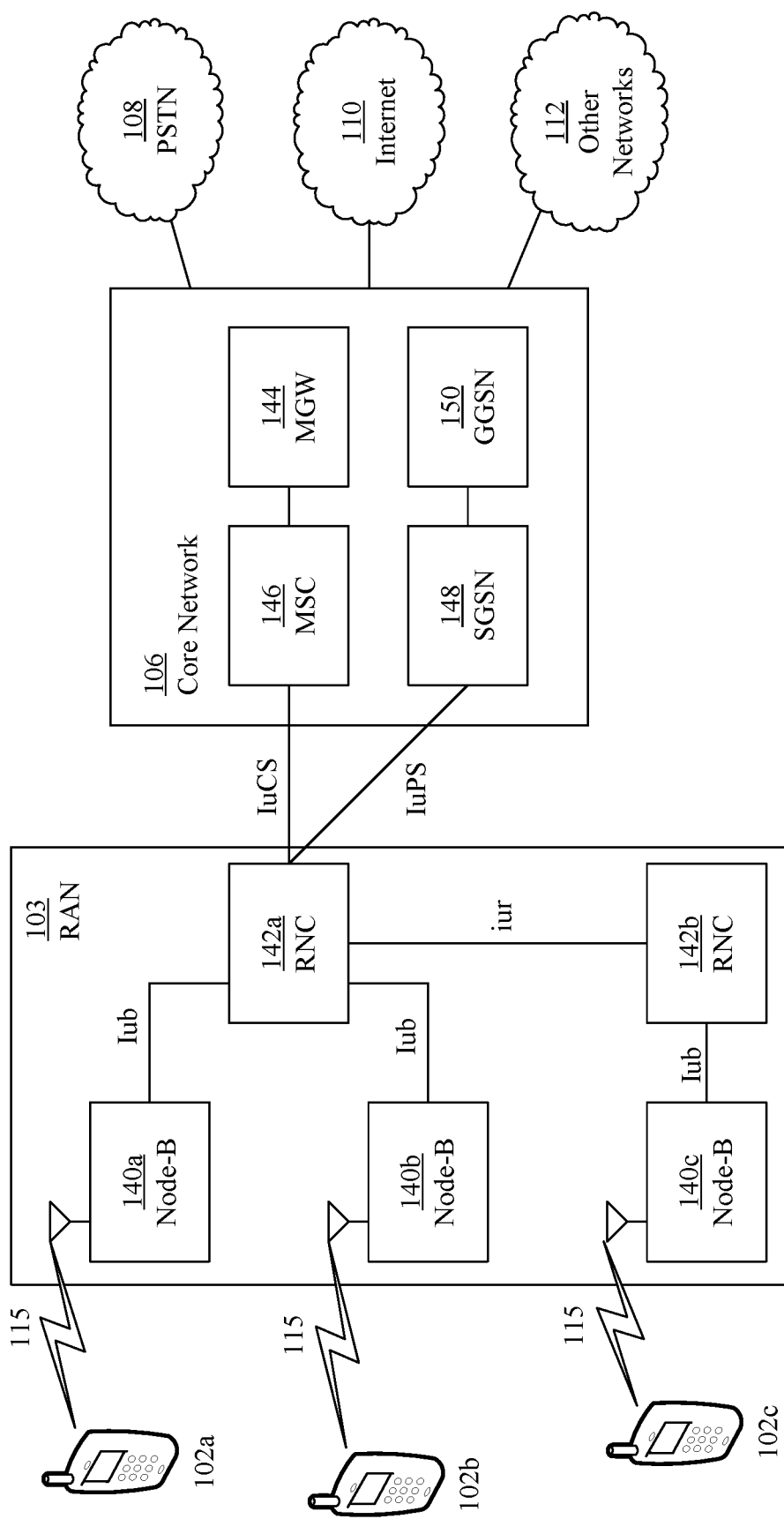
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
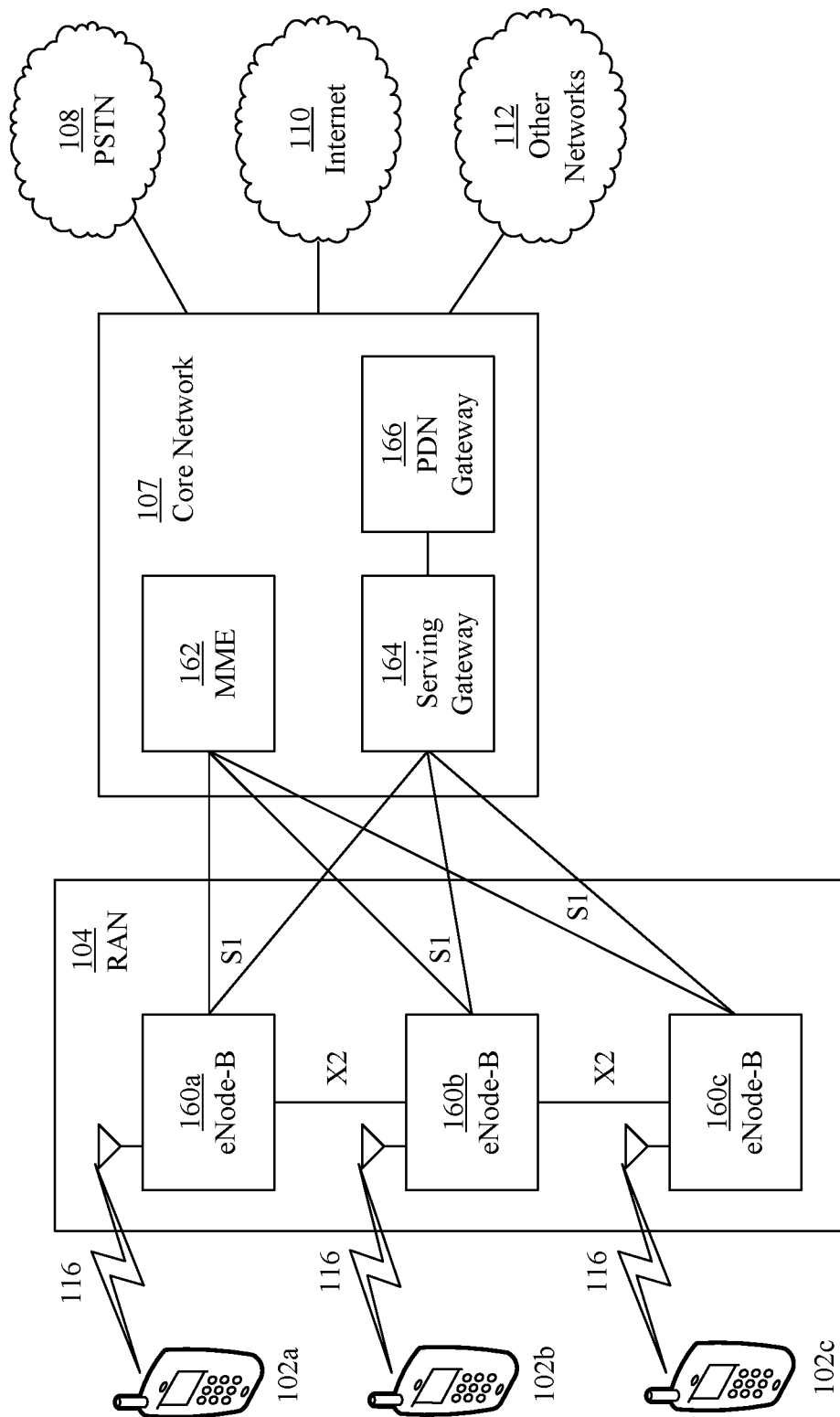
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
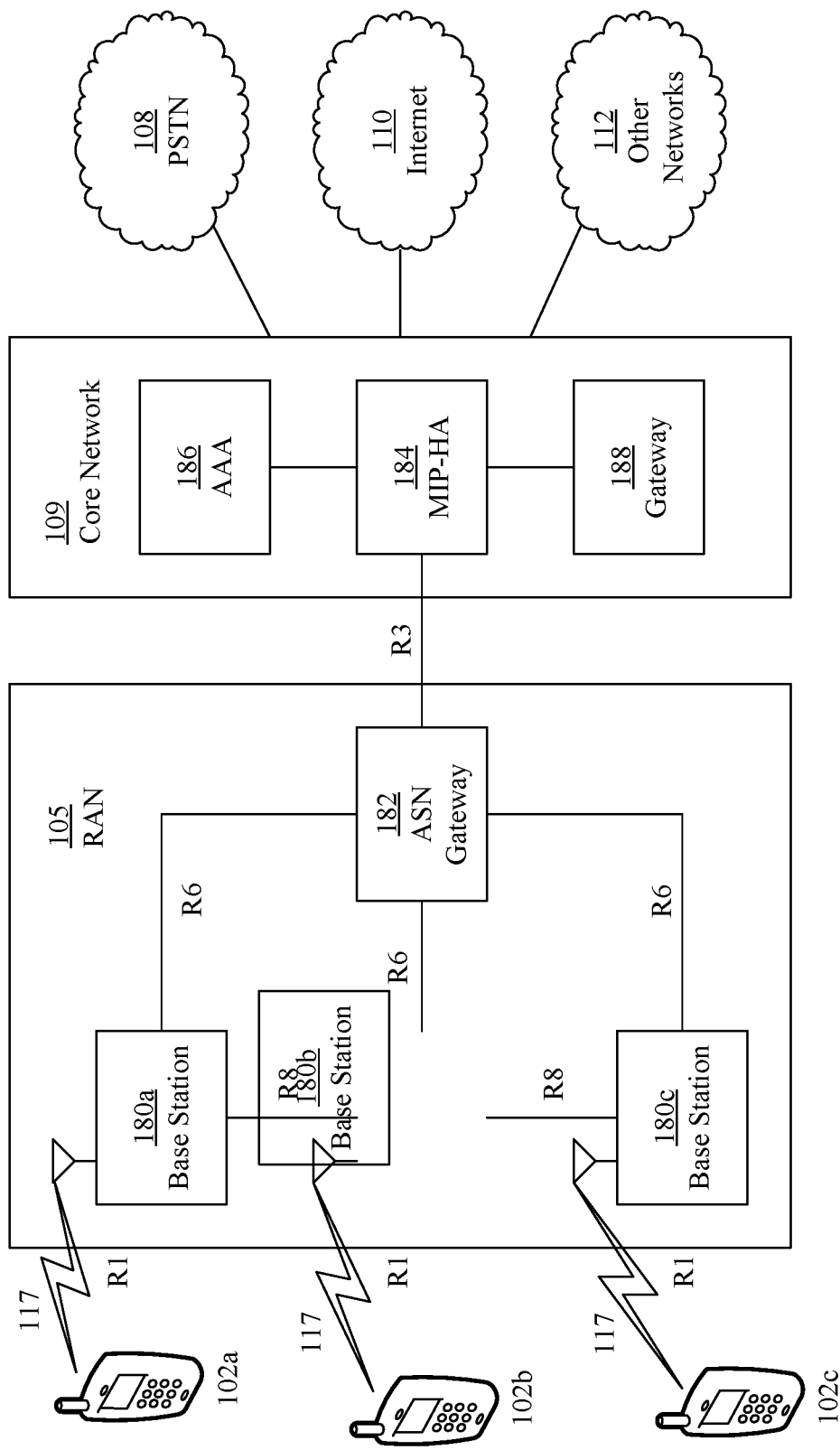
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

As new applications continue to emerge for cellular technology, data rates may increase, latency may decrease, and connectivity may expand. For example, a mobile communication system (e.g., a 5G system) may support enhanced Mobile BroadBand (eMBB) communications, Ultra-Reliable and Low-Latency Communications (URLLC) and massive Machine Type Communications (mMTC). Radio access capabilities may differ (e.g., in terms of priority) across a broad range of applications and usage scenarios. For example, design considerations for eMBB applications and/or usage scenarios may include spectral efficiency, capacity, user data rates (e.g., peak and/or average data rates) and mobility. Design considerations for mMTC applications and usage scenarios may include connection density.

Multiple access (MA) techniques may be used in one or more applications and/or usage scenarios. MA techniques may improve spectral efficiency, e.g., for eMBB applications and/or usage scenarios. MA techniques may support a massive number of connected terminals. The connected terminals may use short data burst transmissions and/or may be configured for low device complexity, low power consumption and/or extended coverage. MA techniques may be designed to support a variety of applications with a variety of goals in a radio access network.

Certain multiple access schemes may assign time, frequency, and/or spatial resources in ways to prevent a first user signal (e.g., each user signal) from interfering with a second user signal. This type of access may be referred to as Orthogonal Multiple Access (OMA). With OMA, transmissions by different WTRUs may be multiplexed on orthogonal resources. The multiplexing may be performed in the time domain (TDM), in the frequency domain (FDM), or in the spatial domain (SDM).

Non-orthogonal multiple access schemes (NOMA) may allocate non-orthogonal resources to WTRUs. NOMA may be implemented to address challenges of wireless communications, such as high spectral efficiency and massive connectivity. With NOMA, multiple WTRUs may be multiplexed in the power-domain. Different power levels may be allocated to different WTRUs, for example according to the WTRUs' channel conditions. Different WTRUs (e.g., those allocated different power levels) may be allocated the same resources (e.g., in terms of time and/or frequency) and may use those resources for transmission. A receiver (e.g., such as a base station) may be configured to utilize successive interference cancellation (SIC) techniques to reduce or cancel interference among multiple WTRUs.

Power control at a WTRU may include an open loop aspect (e.g., an open loop component) and/or a close loop aspect (e.g., a closed loop component). In an example, a WTRU may use (e.g., as part of an open loop component) a measured and/or determined value, such as a path loss value, to determine (e.g., to calculate) transmission power. A WTRU may use (e.g., as part of an open loop component) one or more parameters that the WTRU is configured with or is capable of computing to determine a transmission power. Such parameters may include, for example, the size of a UL grant. A WTRU may receive (e.g., dynamically such as at any time) a transmit power control (TPC) commands. The TPC commands may include (e.g., provide) a value and/or an offset (e.g., an increment or decrement). A WTRU may use (e.g., as part of a closed loop component) the TPC command value and/or an accumulation of TPC command offsets to determine a transmission power. The former approach may be referred to herein as absolute TPC, and the latter approach may be referred to herein as TPC accumulation.

A WTRU may determine (e.g., calculate) a transmission power for a signal or a channel (e.g., a UL channel such as a PUSCH or PUCCH). A WTRU may determine a transmission power for a set of signals or channels (e.g., multiple UL channels such as PUSCHs and/or PUCCHs). A WTRU may determine a transmission power for a part of a transmission such as a time period of the transmission, a TTI, a subframe, a symbol, etc. A WTRU may be configured to apply a TPC command that the WTRU received in time period n to a TPC accumulator in time period n+k, where k may be an integer multiple of TTIs. For example, the WTRU may have received a TPC command in time period n that included a transmission power offset. The WTRU may (e.g., in time period n+k) add the transmission power offset to a TPC accumulator, or subtract the transmission power offset from the TPC accumulator.

Equation 1 below illustrates an example of calculating a channel power, Pchan.

$$Pchan = Popenloop + Pclosedloop \qquad Eq. 1$$

As shown, the channel power, Pchan, may include an open loop component, Popenloop, and/or a close loop component, Pclosedloop. It should be noted that, although both Popenloop and Pclosedloop are shown in the example equation above, either Popenloop or Pclosedloop may be omitted from the calculation.

Equation 2 below illustrates an example of calculating a channel power for a carrier or other system component, c, $Pchan_{,c}$.

$$Pchan_{,c} = Popenloop_{,c} + Pclosedloop_{,c} \qquad Eq. 2$$

As shown, the channel power for carrier or system component c, $Pchan_{,c}$, may include an open loop component, $Popenloop_{,c}$, and/or a close loop component, $Pclosedloop_{,c}$. It should be noted that, although both $Popenloop_{,c}$ and $Pcloseloop_{,c}$ are shown in the example equation above, either $Popenloop_{,c}$ or $Pclosedloop_{,c}$ may be omitted from the calculation.

A channel or component power may be limited to a maximum allowed power, Pcmax,c. For example, a WTRU may be configured to limit $Pchan_{,c}$ to Pcmax,c, as illustrated by Equation 3 below.

$$Pchan_{,c} = min[Pcmax_{,c}, (Popenloop_{,c} + Pclosedloop_{,c})] \qquad Eq. 3$$

As shown, a WTRU may determine that the channel or component power $Pchan_{,c}$ is the lessor of a maximum allowed power, Pcmax,c, or a calculated power represented by $Popenloop_{,c} + Pclosedloop_{,c}$.

Equation 4 illustrates an example of calculating a power for a PUSCH channel on carrier c.

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} \qquad Eq. 4$$

As shown, i may represent a time period such as a subframe or TTI. The power of a PUSCH channel on carrier c during time period i may be determined as the lessor of a maximum allowed power, $P_{CMAX,c}(i)$, or a calculated power. The maximum allowed power may be configured (e.g., by a network). The calculated power may be determined as a sum of one or more of following components. The components may include a value derived based on a number of resource blocks granted for a transmission or $M_{PUSCH,c(i)}$. For example, such a value may be calculated as $10*\log_{10}(M_{PUSCH,c}(i))$. The components may include one or more values (e.g., signaled values), $P_{o\_PUSCH,c}$, that may be related to a desired SNR or SINR at a receiver. The one or more values may be determined, for example, as a function of the transmission type j. The components may include a value determined based on pathloss, $PL_c$, and a signaled parameter, $\alpha_c$. Such a signaled parameter, $\alpha_c$, may be determined as a function of the type of transmission j. The components may include a TPC value or accumulated TPC value, $f_c(i)$. The components may include $delta_{TF,c}$ (e.g., only when higher layer signaling indicates that $delta_{TF,c}$ is to be included). $delta_{TF,c}$ may be determined as a function of a number of data and/or control bits transmitted, for example.

A WTRU may compare its computed power or a sum of its computed powers for its channels (e.g., channels to be transmitted) with a maximum output power $P_{cmax}$. The WTRU may perform the comparison before finalizing the power to use for transmission, for example. Maximum output power $P_{cmax}$ may be, for example, the WTRU's configured maximum power. Maximum output power $P_{cmax}$ may be, for example, the maximum power associated with the WTRU's power class less allowed power reductions. Maximum output power $P_{cmax}$ may be, for example, the lesser of a signaled maximum power and the maximum power associated with the WTRU's power class. Power reductions may be determined, for example, as a function of a transmitted signal. Power reductions may be used, for example, to prevent the WTRU from violating spectral emission and/or other transmit requirements.

A WTRU may set its transmission power to $P_{cmax}$. A WTRU may use $P_{cmax}$ for its transmission power, for example, when the calculated or determined power may exceed $P_{cmax}$. A WTRU may scale its transmission power (e.g., for one or more channels) to avoid exceeding $P_{cmax}$. Such scaling may be applied, for example, when the calculated or determined power may exceed $P_{cmax}$. A WTRU may drop a channel (e.g., not transmit on the channel) or may set the transmission power to zero for one or more channels to avoid exceeding $P_{cmax}$, for example, when the calculated or determined power may exceed $P_{cmax}$. A channel or channels that may be scaled or dropped may depend on one or more priority rules.

Design goals for an MMTC system may include massive connectivity (e.g., overloading resources), low power consumption, and/or extended coverage. A scheduled multiple access scheme, such as an MA scheme used in LTE, may have significant signaling overhead. For example, a WTRU may (e.g., after achieving DL synchronization) perform a random access procedure (e.g., to correct its UL timing alignment), and may transmit data when a grant is provided by a base station. These procedures may increase signaling overhead (e.g., due to control information transmission), and/or may consume the WTRU's power.

A WTRU may be configured to transmit without establishing timing alignment and/or waiting for a grant. However, such transmissions may create multiple access interference at a receiver, for example because multiple WTRUs may transmit at the same time (e.g., use the same resources).

In an example, receivers and/or WTRUs may be configured to reduce interference and/or to properly decode data transmitted by the WTRUs.

In some scenarios, such as when power domain NOMA is used for a set of two or more WTRUs, an increase in the transmission power of at least one of the WTRUs (e.g., a nearby WTRU) may enable a receiver to separate or distinguish transmissions that may be overlapping on the same set of resources. For purposes of distinguishing transmissions, TPC accumulation may or may not be an efficient approach. For example, if NOMA is used for a first transmission and not for a second transmission (e.g., a transmission subsequent to the first transmission), transmission power may be increased significantly for the first transmission and decreased by the same amount for the second transmission. A WTRU that misses the grant for the first transmission and receives a grant for the second transmission may decrease the value of a TPC accumulator without having first increased it. As such, transmission power for the second transmission may become unacceptably low. Absolute TPC (e.g., use of a TPC value instead of TPC accumulation) may or may not be efficient to distinguish transmissions, either. For example, absolute TPC may interfere with a WTRU's ability to fine-tune transmission power unless a large number of bits are used.

A network and/or WTRU may be configured to use hybrid multiple access. The network and/or WTRU may be configured to use a combination of power allocation, spreading, and/or scrambling techniques to separate data streams that may originate from the same or different WTRUs. Spreading and/or scrambling may enable data bits to be transmitted over multiple resources, such as subcarriers. In an example, data bits may be converted to one or more modulation symbols (e.g., one or more QAM symbols) before being multiplied by a sequence. The results (e.g., resulting coefficients) may be transmitted on time/frequency resources. In an example, data bits may be mapped (e.g., directly mapped) to a sequence or codeword, which in turn may be mapped to frequency resources (e.g., sub-carriers).

Different WTRUs may be configured to transmit data using different transmission powers (e.g., high power or low power). The WTRUs may use a combination of power allocation, scrambling, and/or spreading techniques (e.g., such as sequence allocation), for example to permit a receiver to separate or distinguish data transmissions originating at different WTRUs.

Multiple groups of WTRUs may transmit to a common receiver. Each such group may include one or more WTRUs. The WTRUs in a first group may be configured to adjust their respective transmit power such that received power from the WTRUs may be higher or lower than received power from WTRUs in a second group. A receiver (e.g., a base station) may be configured to separate different groups of WTRUs based on the difference between the received power of those groups of WTRUs. The receiver may be further configured to separate data from different WTRUs within a same group. For example, the receiver may separate data from different WTRUs using techniques such as spreading and/or interleaving (e.g., interleaving of channel coded data with WTRU-specific interleaving patterns).

To illustrate, a first group of WTRUs may include a single WTRU referred to as the first WTRU. The first WTRU may be transmitting to an intended receiver. Received power from the first WTRU may be designated as Po. A second group or set of WTRUs may include one or more WTRUs and the one or more WTRUs may be transmitting on the same or partially overlapping resources (e.g., subcarriers) as the first WTRU. The received power from the second set of WTRUs may be designated as P1. P1 may be lower or higher than Po. As such, the receiver may differentiate transmissions by the second set of WTRUs from transmissions by the first WTRU, for example, based on the received power difference between the second set of WTRUs and the first WTRU. The WTRUs (e.g., the first WTRU and/or the second set of WTRUs) may use low coding rates and/or low modulation orders, for example, when the difference between Po and P1 is small (e.g., below a threshold). The receiver may further differentiate transmissions among the second set of WTRUs, for example, via spreading and/or interleaving. Spreading sequences and/or interleaving patterns may be different for each WTRU in the second set.

A transmitted signal from the first WTRU may be described, for example, according to Equation 5 below.

$$x_1 = DF'_N B_1 F_M P_o d \qquad \text{Eq. 5}$$

As shown, d may represent a data vector with a size of M×1. $F_M$ may represent an M×M (e.g., normalized) DFT matrix. $B_1$ may represent an N×M subcarrier mapping matrix that maps the output of the DFT matrix to allocated subcarriers. $F'_N$ may represent a Hermitian of the N×N DFT matrix. Po may represent a power allocation matrix, and D may represent a cyclic prefix addition matrix. While the example in Equation 5 may assume usage of a DFT-s-OFDM waveform for transmission, other waveforms such as OFDM, Zero Tail DFT-s-OFDM, and/or Unique Word DFT-s-OFDM waveforms may also be used to transmit the signal. The transmitted signal may be written in a different format when a different waveform is used. For example, DFT matrix $F_M$ may be omitted when an OFDM waveform is used.

A transmitted signal from one of the WTRUs (e.g., WTRU k) in the second set may be described, for example, according to Equation 6 below.

$$x_k = DF'_N B_k F_K C_k P_{1k} d_k \qquad \text{Eq. 6}$$

As shown, $C_k$ may represent a spreading/scrambling matrix. $P_{1k}$ may represent a power allocation matrix. $B_k$ may represent an N×K subcarrier mapping matrix that maps the output of the DFT matrix to allocated subcarriers. $F'_N$ may represent a Hermitian of the N×N DFT matrix, and D may represent a cyclic prefix addition matrix. $F_K$ and $C_k$ may be combined into a single DFT matrix. $F'_N$ may represent a Hermitian of the N×N DFT matrix, and D may represent a cyclic prefix addition matrix. While the example in Equation 6 assumes usage of a DFT-s-OFDM waveform for transmission, other waveforms such as OFDM, Zero Tail DFT-s-OFDM, and/or Unique Word DFT-s-OFDM waveforms may also be used to transmit the signal. Further, other spreading techniques may be used, and a spreading operation may or may not be written as a linear matrix multiplication.

Signals transmitted from higher power WTRUs (e.g., the first WTRU described above) and lower power WTRUs (e.g., the WTRUs in the second set of WTRUs described above such as WTRU k) may be combined over the air and may be received by a receiver (e.g., a base station). The receiver may be a multiuser detection based receiver configured to detect signals transmitted by different WTRUs. In an example, the receiver may decode signals from higher power WTRUs first, and subtract the higher power signals from the received signals. The receiver may then detect (e.g., identify) signals from lower power WTRUs, e.g., by using one or more de-spreading techniques), and process the de-spread signals.

The first WTRU group described above may include one or more other high power WTRUs in addition to the first WTRU. The multiple high power WTRUs in the first group may simultaneously transmit data. These WTRUs may use different spreading sequences and/or interleaving patterns to improve signal detection capability. Two or more groups of WTRUs may transmit data after spreading and/or interleaving. The two or more groups of WTRUs may map the spread and/or interleaved data to subcarriers, e.g., directly or after passing through an intermediate block such as a DFT block. Different groups of WTRUs may use different levels of transmission power, coding levels, and/or modulation levels. Transmissions by the groups may be separated, for example, based on one or more transmission parameters. Transmissions by different WTRUs within a group may be separated, for example, based on separation properties such as spreading sequences and/or interleaving patterns.

Figure 2:
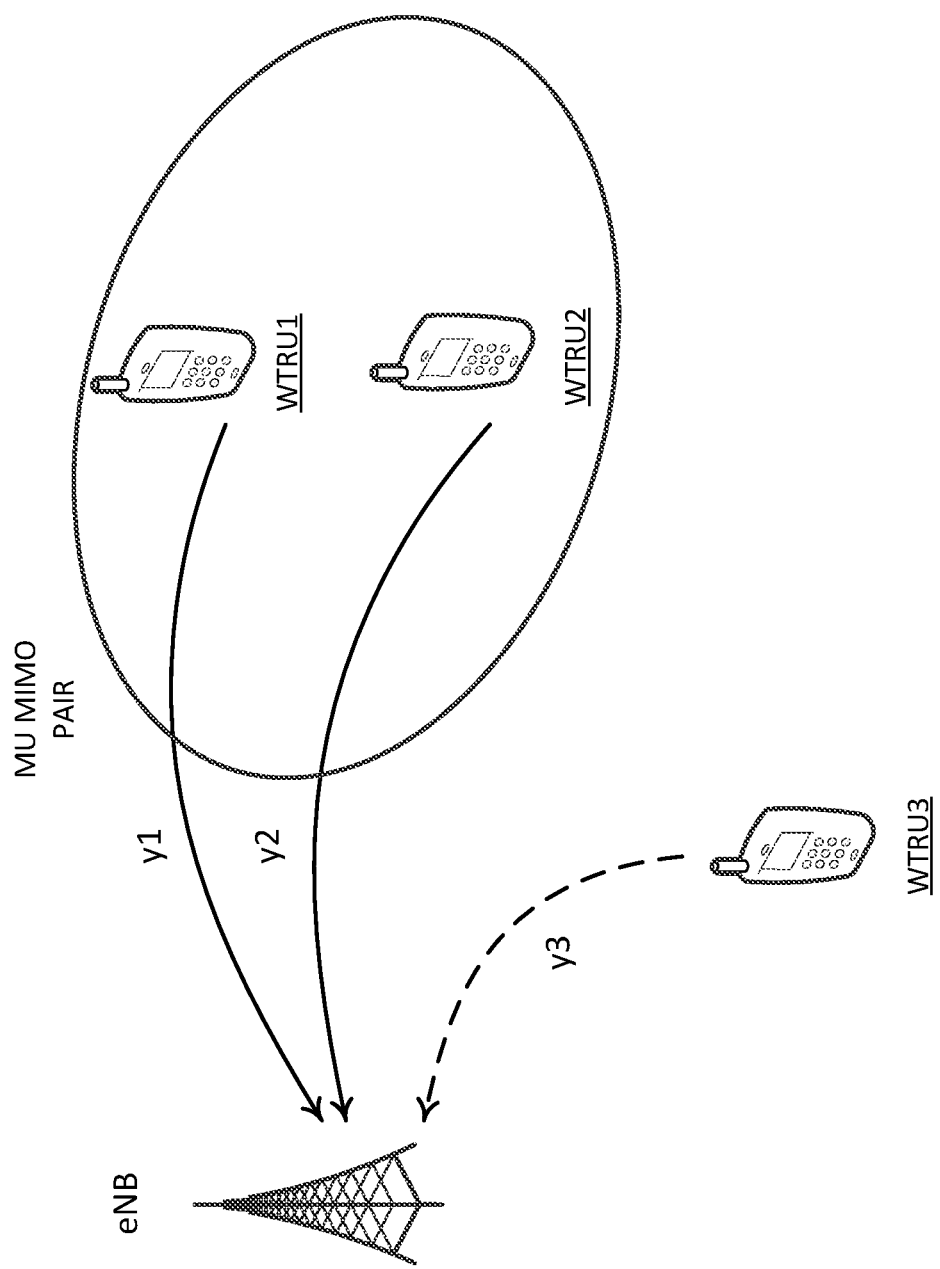
FIG. 2 is an example of user grouping and successive cancellation for uplink (UL) NOMA.

FIG. 2 is an example of user grouping and successive cancellation for UL NOMA. While FIG. 2 shows an example involving a cell with three WTRUs, the example may be extended to other cases such as those including more or fewer WTRUs. In an example, the group {WTRU1, WTRU2} may be paired with WTRU3 for a UL NOMA operation. In an example, WTRU3 may have a larger power offset than the aggregated power of the group {WTRU1, WTRU2}. One or more of the following may apply and/or be performed, e.g., in relation to FIG. 2.

WTRU1, WTRU2, and/or WTRU3, which may potentially utilize UL NOMA, may be configured to report at least a part of their operational information, such as channel state information (CSI) and/or power headroom, to a network. The reported information may be used, for example, to group the WTRUs. WTRU1 and WTRU2 may be configured to operate in a MU-MIMO transmission mode. WTRU1 and WTRU2 may be configured to use a common set of UL demodulation reference signals (DMRS), e.g., for layer separation and demodulation. WTRU3 may be configured to use UL NOMA and/or to maintain and apply a power offset.

A base station may receive UL signals y1, y2, y3 from WTRU1, WTRU2 and WTRU3, respectively. The base station may attempt to demodulate and decode UL signal y3 from WTRU3, e.g., ahead of y1 and/or y2 (e.g., by treating signals y1 and/or y2 from the {WTRU1, WTRU2} pair as noise). The base station may regenerate and/or separate y3 from the aggregated received signal to derive (e.g., yield) transmitted signals y1, y2. The base station may perform multiuser detection on the derived signals y1, y2 to separate y1 from y2.

A WTRU may perform high and low power transmissions. A WTRU may transmit two or more streams of data. A WTRU may allocate varying levels of power to two or more data streams. A signal transmitted from a single WTRU may be described, for example, according to Equation 7 below.

$$x = DF'_N BF_M P_{high} d_h + DF'_N BF_M CP_{low} d_l \qquad \text{Eq. 7}$$

As show, $d_h$ may represent data transmitted with high power and $d_l$ may represent data transmitted with low power. A WTRU may be configured to transmit one or more data streams per each power level. A WTRU may spread data streams using spreading sequences. A WTRU may channel encode data streams with different coding rates. A WTRU may interleave coded bits with different interleaving patterns.

In an example of a scheduled system, a central controller (e.g., a base station) may be configured to indicate one or more transmission parameters such as transmission power levels, coding and modulation levels, spreading sequences, and/or interleaving patterns to a WTRU. The central controller may indicate the transmission parameters in a control channel, for example. Additionally or alternatively, the central controller may configure the WTRU with the transmission parameters semi-statically, such as at the time of establishing an initial connection with the WTRU. In an example of a grant-free and/or contention based transmission scheme, a WTRU may be configured to select one or more of the aforementioned transmission parameters autonomously (e.g., without signaling or configuration by a central controller). In one or more of the foregoing schemes, a WTRU may choose all or a subset of the transmission parameters to use in a specific transmission.

Transmissions from WTRUs within a group may be separated, e.g., by utilizing a different interleaving pattern for each WTRU. A WTRU may puncture and/or interleave information bits, for example, after those information bits are coded by a channel encoder (e.g., such as a turbo coding block). A puncturing and/or interleaving pattern may be controlled, for example, by a central controller, or may be implicitly indicated by other transmission parameters.

Figure 3:
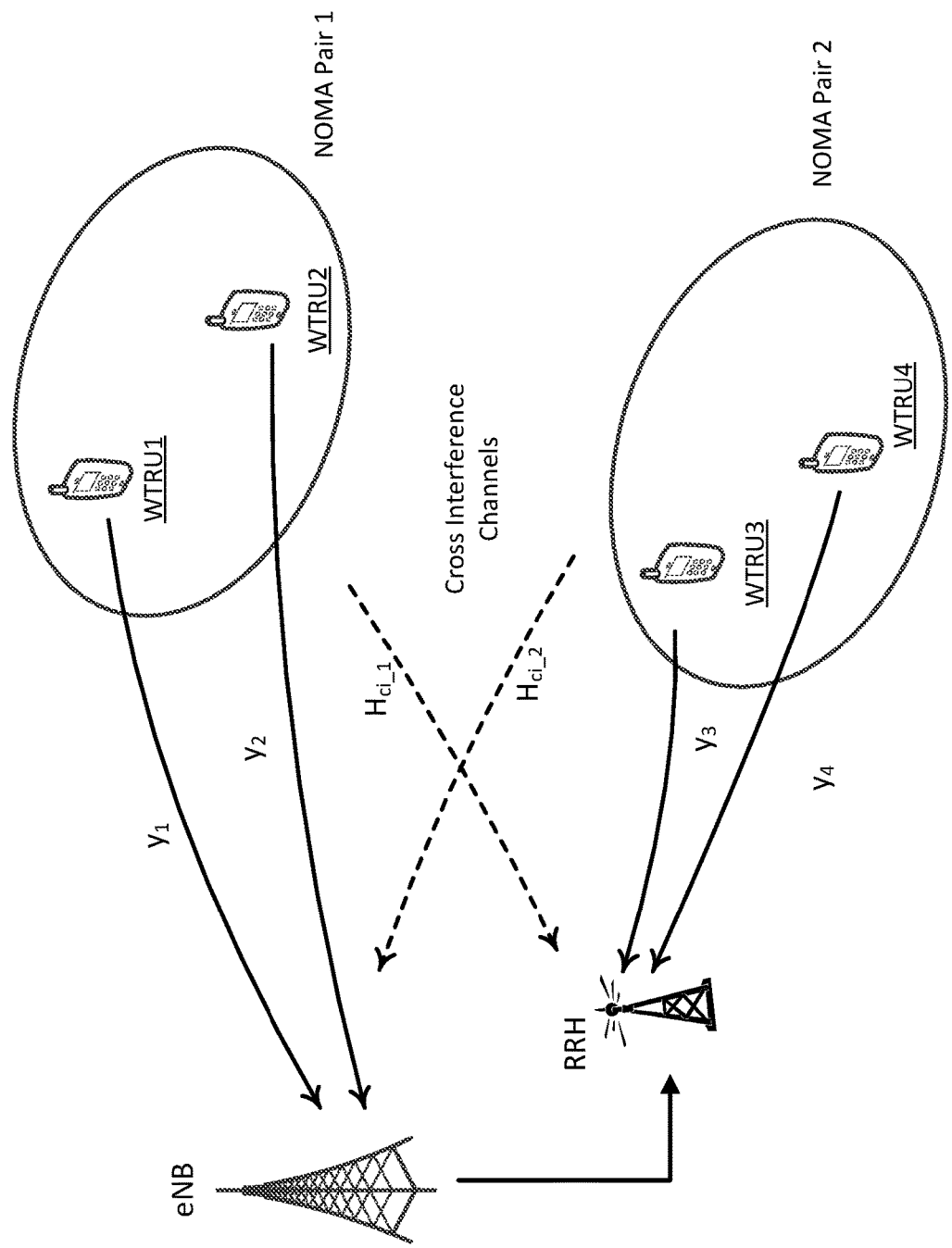
FIG. 3 is an example of user grouping for interference alignment for UL NOMA.

FIG. 3 is an example of user grouping for interference alignment for UL NOMA. The example includes two WTRU pairs for UL NOMA operation. Other examples and implementations may have the same or different numbers of groups and/or configurations. A first NOMA WTRU pair may include {WTRU1, WTRU2}, which may be served (e.g., directly) by a base station. A second NOMA WTRU pair may include {WTRU3, WTRU4}, which may be served by a remote radio head (RRH). In an example configuration, the WTRU with higher power offset may be identified in each pair. One or more of the following may apply and/or be performed, e.g., in relation to FIG. 3.

WTRU1-WTRU4, which may potentially use UL NOMA, may be configured to report at least a part of their operational information, such as channel state information (CSI) and power headroom, to a network. The reported information may be used to group the WTRUs, for example. The WTRU pairs {WTRU1, WTRU2} and {WTRU3, WTRU4} may be configured to maintain a power offset. The base station and RRH may perform interference measurement, for example, by measuring an aggregate signal received on channels corresponding to respective non-serving UL NOMA groups. For example, the base station may measure an aggregated signal $H_{ci\_2}$ from NOMA Pair 2 {WTRU3, WTRU4}, and the RRH may measure an aggregated signal $H_{ci\_1}$ from NOMA Pair 1 {WTRU1, WTRU2}.

The base station and RRH may communicate measured interference channels and/or their quantized versions to opposing NOMA WTRU pairs. For example, $H_{ci\_2}$ may be reported back to NOMA Pair 2 {WTRU3, WTRU4}, and $H_{ci\_1}$ may be reported to NOMA Pair 1 {WTRU1, WTRU2}. The base station and RRH may measure CSI and/or channel direction information (CDI), and may communicate the information to the WTRUs. Upon receiving the interference CSI/CDI, a WTRU may perform UL precoding. Such UL precoding may cause null space in the WTRU's beam to be aligned in the direction of the reported interference CSI/CDI.

The base station and RRH may perform beamforming, e.g., upon receiving UL signals from the WTRUs. Such beamforming may reduce cross-pair interference and/or successive interference that may occur during NOMA decoding in each pair of WTRUs. The operations described herein may reduce interference associated with UL NOMA between two independent cells.

A WTRU may be configured to perform asynchronous and/or grant-free UL multiple access. A WTRU may transmit a signal (e.g., to an eNB, a non-eNB receiver, etc.) without an uplink grant. Such transmissions may be referred to herein as grant-free transmissions. Grant-free transmissions by multiple WTRUs may not have correct uplink timing and/or synchronization. For instance, grant-free transmissions by multiple WTRUs may arrive at an eNB or a non-eNB receiver asynchronously with relative timing offsets.

Figure 4:
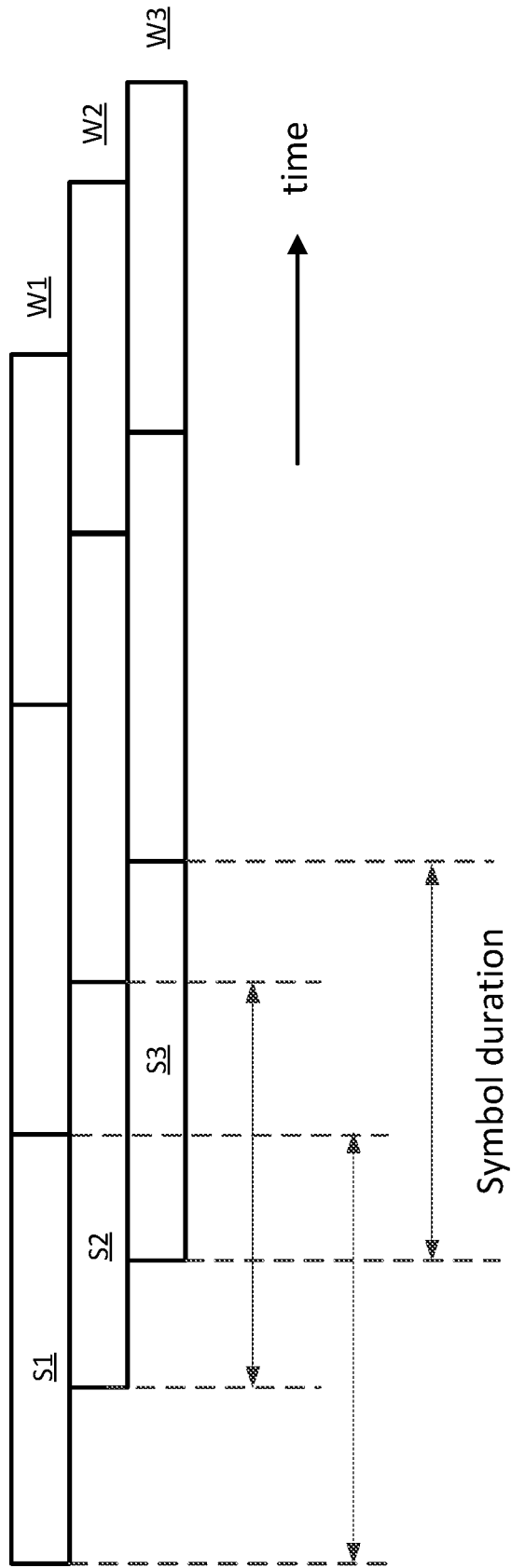
FIG. 4 is an example of asynchronous transmission with timing offset among different WTRUs.

FIG. 4 is an example of asynchronous transmissions with timing offsets among different WTRUs. The example shows the timing of symbols S1, S2, S3 as they arrive at a receiver from three different WTRUs W1, W2, W3. The symbols S1, S2, S3 may be the output of a multicarrier waveform (e.g., OFDM) and/or a single carrier waveform. The symbols S1, S2, S3 may have a same or different durations, and may arrive at the receiver at different times (e.g., with a same or different timing offsets).

A self-contained transmission may be used, for example, when transmissions from different WTRUs are asynchronous. A self-contained transmission may include information (e.g. all necessary information) to correctly identify and decode the data. A receiver may determine (e.g., acquire) the timing of one or more WTRUs even though signals from the WTRUs may arrive asynchronously. Such timing determination (e.g., timing acquisition) at the receiver may be enabled, for example, by using a waveform with a built-in deterministic sequence. Examples of such a deterministic sequence may include Unique Word (UW) DFT-s-OFDM or a single carrier waveform with UW. A UW may also be referred to as a known signal between a transmitter and a receiver. Various techniques may be employed to transmit a UW. For instance, when UW DFT-s-OFDM is used, a UW may be inserted into a DFT block, added to a time domain signal after the IFFT block, and/or generated by an alternative technique. As another example, when a single carrier waveform is used, a UW may be inserted between groups of data symbols. A UW may be transmitted on certain time/frequency resources. For example, with an OFDM waveform, one or more OFDM symbols may be allocated for the transmission of a UW.

One or more of the following may apply for a UW. A UW may include a sequence such as a Zadoff-Chu sequence, an m-sequence, a gold sequence, etc. A UW's parameters including sequence index, sequence length, and/or transmission power level may be determined based on one or more of the following. The parameters may be determined based on a predefinition or predetermination. The parameters may be determined based on higher layer signaling. The parameters may be determined based on dynamic indication. The parameters may be determined based on a subframe number. The parameters may be determined based on a radio frame number. The parameters may be determined based on a WTRU ID (e.g., based on C-RNTI). The parameters may be determined based on a Cell ID (e.g., based on a Physical cell ID or a virtual cell ID). The parameters may be determined based on the time and/or frequency location of a relevant signal. The parameters may be determined based on the coverage level of a relevant WTRU. A UW may include a portion of the time samples of a modulated symbol. For example, a UW may be associated with a last and/or first part of a modulated symbol. A UW may include a set of one or more modulated data symbols with known information. A UW may include a zero signal. A UW may not include a signal when a null signal or zero-power signal is transmitted. A UW may include a set of subcarriers used.

A WTRU may be configured to select a UW as a WTRU specific sequence or a group specific sequence. A WTRU may be configured to select a UW as a group specific sequence when, for example, the WTRU belongs to a group that includes multiple WTRUs. Multiple WTRUs that are associated with a same group may use the same UW. A receiver associated with one or more WTRUs may correlate a received signal with one or more (e.g., all) possible UWs that may have been used by the WTRUs in transmission. The receiver may, through the correlation, find the timing boundaries of one or more symbols. The receiver may, through the correlation, identify the WTRU that transmitted the received signal, and/or the group that the WTRU belongs to.

A WTRU or a set of WTRUs may start transmitting with a long or short UW. UW length may be adjusted (e.g., by a network or a central controller). A network may estimate the timing for uplink reception, e.g., by utilizing measurements that may be based on uplink data and/or reference signal transmissions. The network may determine whether the length of a UW should be modified (e.g., based on the measurements). The network may signal the determination (e.g., explicitly) to a WTRU or set of WTRUs. The signaling may be occasional (e.g., relatively infrequently), and/or may depend on the type of functions performed by the concerned WTRU(s) (e.g., eMBB, critical MTC or cMTC, mMTC, etc.).

As an example, design considerations for low power, low complexity WTRUs involved in mMTC may include reducing complexity and/or minimizing power consumption. As such, it may be sufficient in those scenarios to use a coarser level of granularity in terms of UW lengths, and a UW update may or may not be explicitly signaled.

As an example, WTRUs involved in cMTC may use a finer level of granularity for UW lengths. For those WTRUs, a network may reconfigure (e.g., dynamically) the length of a UW, for example through L1/L2 control signaling. The network may perform the reconfiguration based on one or more measurements, as described herein.

A WTRU may determine a UW based on uplink resources used. For example, a set of UWs may be reserved. A WTRU may select a UW from the reserved UWs to indicate the uplink time/frequency resources used for an uplink transmission. The WTRU may make the selection based on the uplink time/frequency resources selected for an asynchronous uplink transmission.

A first UW in a set of reserved UWs may be associated with a first uplink resource in a subframe. The first uplink resource may be a first PRB in the subframe, for example. A second UW in the set of reserved UWs may be associated with a second uplink resource in a subframe. The second uplink resource may be a second PRB in the subframe, for example. The number of UWs in a set of reserved UWs may be determined based on a system bandwidth and/or uplink resources used for an asynchronous uplink transmission. The length of UWs may be determined based on the number of uplink resource candidates.

A WTRU may be configured to use one or more sets of UWs. A WTRU may determine the set of UWs to use based on the number of PRBs used. A UW within a set of UWs may indicate (e.g., be associated with) one or more PRB(s) used. For example, a first set of UWs may be used for an uplink transmission that uses one PRB, and a UW within the first set may indicate which PRB is used for the uplink transmission. A second set of UWs may be used for an uplink transmission that uses N (e.g., N>1) PRBs, and a UW within the second set may indicate which N PRBs within a system bandwidth are used for the uplink transmission. One or more of the following may apply. A WTRU may determine the number of sets of UWs that the WTRU may use based on the number of uplink resource candidates in terms of PRBs. For example, three sets of UWs may be used when uplink resource candidates for an uplink transmission include 1, 2 and 4 PRBs. A WTRU may determine a set of UWs based on a base sequence used. The WTRU may further determine (e.g., distinguish) a UW within the set of UWs based on a cyclic shift of the base sequence.

A WTRU may determine a UW based on a transport block size and/or a modulation order transmitted in an uplink transmission. For example, a set of one or more transport block sizes and/or modulation orders may be used as resource candidates for an uplink transmission, and a WTRU may determine a UW as a function of the set of one or more transport block sizes and/or modulation orders. Additionally or alternatively, one or more PRBs for an uplink transmission may be predefined or configured, and a WTRU may determine the transport block size and/or modulation order for the uplink transmission based on the one or more PRBs. The WTRU may indicate the determined transport block size and/or modulation order via a UW. Additionally or alternatively, a WTRU may determine a UW based on the PRB resource, transport block size, and modulation order used in an uplink transmission.

A WTRU may be configured to use one or more types of UWs. For example, a WTRU may use a first type of UW based on a predefined sequence, and a second type of UW based on a null signal (e.g., a zero-power signal). UW types may include one or more of the following. UW types may include a sequence (e.g., a predefined sequence). UW types may include a reference signal sequence. UW types may include a null signal (e.g., a zero-power signal). UW types may include a part of a modulation symbol (e.g., an OFDM symbol or DFT-s-OFDM symbol). UW types may include a set of subcarriers used.

UW types may be determined based on uplink transmission schemes. For example, a first UW type may be used for a first uplink transmission scheme and a second UW type may be used for a second uplink transmission scheme. A transmission scheme may be determined based on one or more of the following. A transmission scheme may be determined based on whether the transmission is synchronous or asynchronous. A transmission scheme may be determined based on whether the transmission is grant-based or grant-free. A transmission scheme may be determined based on a modulation scheme used for the transmission (e.g., OFDM, DFT-s-OFDM, etc.). A transmission scheme may be determined based on a multiple access scheme used for the transmission (e.g., FDM, CDM, etc.).

In examples, a first UW type (e.g., a sequence-based UW) may be used for an uplink grant-free transmission and a second UW type (e.g., a null-signal-based UW) may be used for an uplink grant-based transmission. A WTRU may determine a UW for an uplink transmission based on the uplink reference signal used. For example, a WTRU may be configured to use a set of one or more uplink reference signal sequences as uplink resource candidates. The WTRU may select one or more of the set of uplink reference signal sequences for an uplink transmission. The WTRU may determine a UW based on the uplink reference signal sequences used. The WTRU may indicate via the UW the uplink reference signal sequences used. A receiver such as an eNB may detect a UW. The receiver may determine one or more uplink reference signal sequences used based on the detected UW. Such a determination may assist the receiver with demodulating an uplink transmission.

A WTRU may determine a time/frequency resource for an uplink transmission based on the WTRU's coverage level. For example, a set of one or more time/frequency resources may be configured for an uplink transmission such as an asynchronous uplink transmission, and a WTRU may determine which configured time/frequency resource(s) to use for an uplink transmission based on a coverage level of the WTRU. One or more of the following may apply. A WTRU may determine a coverage level based on downlink measurements such as a measured reference signal received power (RSRP). The WTRU may further determine the number of PRBs associated with a frequency resource based on the coverage level. For example, the WTRU may determine that a frequency resource for a first coverage level (e.g., RSRP≤X [dB]) may include N1 PRBs. The WTRU may determine that a frequency resource for a second coverage level (e.g., X<RSRP≤Y) may include N2 PRBs, where N2 may be greater than N1. The WTRU may determine that a frequency resource for a third coverage level (e.g., Y<RSRP) may include N3 PRBs, where N3 may be greater than N2 (e.g., such that N1<N2<N3).

A WTRU may determine a frequency resource based on measured downlink coverage (e.g., based on reference signal received power (RSRP)). Time/frequency resources for different coverage levels may be non-overlapping. Time/frequency resources associated with a coverage level may be configured, for example, via higher layer signaling.

A WTRU may indicate various transmission parameters through a UW and/or one or more subcarriers on which the UW is mapped. Such transmission parameters may include, for example, the frequency resources (e.g., subcarriers) that the WTRU used for transmission. To illustrate, a UW DFT-s-OFDM waveform may include a UW inserted at the tail of a DFT block. In such a case, the time domain UW signal may be equal to a UW sequence that is up-sampled and/or interpolated. The interpolation may be performed using a Dirichlet function with appropriate scaling, for example. A center subcarrier on which the output of a DFT block may be mapped may be denoted as $F_c$. A UW signal generated at the tail of an IDFT output may be denoted as $w_o(n)$, where n may be a sample index. The same UW sequence may be inserted into the tail of another DFT block that is mapped to a block of subcarriers with a center frequency of $F_o$. The resulting UW signal (e.g., observed at the tail of the IDFT block output) may be described, for example, according to Equation 8 below.

$$w_1(n)=w_o(n)\exp(j2\pi n(F_o-F_c)/N) \qquad \text{Eq. 8}$$

As shown in Equation 8, N represents the number of subcarriers, and it is assumed that the number of used subcarriers is the same whether the output of the DFT is mapped to a center frequency of $F_o$ or a center frequency of $F_C$. It may be observed that $w_1(n)$ may be a modulated version of $w_o(n)$ and may constitute a new UW in the time domain. A receiver may identify the set of subcarriers used by a transmission when the receiver identifies the UW as $w_1(n)$. $F_c$ may be set as a reference subcarrier, for example, so that one or more allocations relative to $F_c$ (e.g., all allocations relative to $F_c$) may have known modulations. Different WTRUs may use a same UW sequence, for example by mapping a DFT output to different sets of subcarriers.

A same or similar approach as described above may be used for an OFDM waveform. A DFT spreading block may not exist in an OFDM waveform. Data symbols may be mapped (e.g., directly mapped) to subcarriers in an OFDM waveform. In an example of OFDM, data and a UW sequence may not be mapped to the inputs of a same IFFT block because such mapping may result in the data and UW sequence being mixed in the time domain. Such data or UW sequence may be mapped to an IFFT block. Further, the data and UW sequence may be time multiplexed, for example, as shown in the example in FIG. 5.

Figure 5:
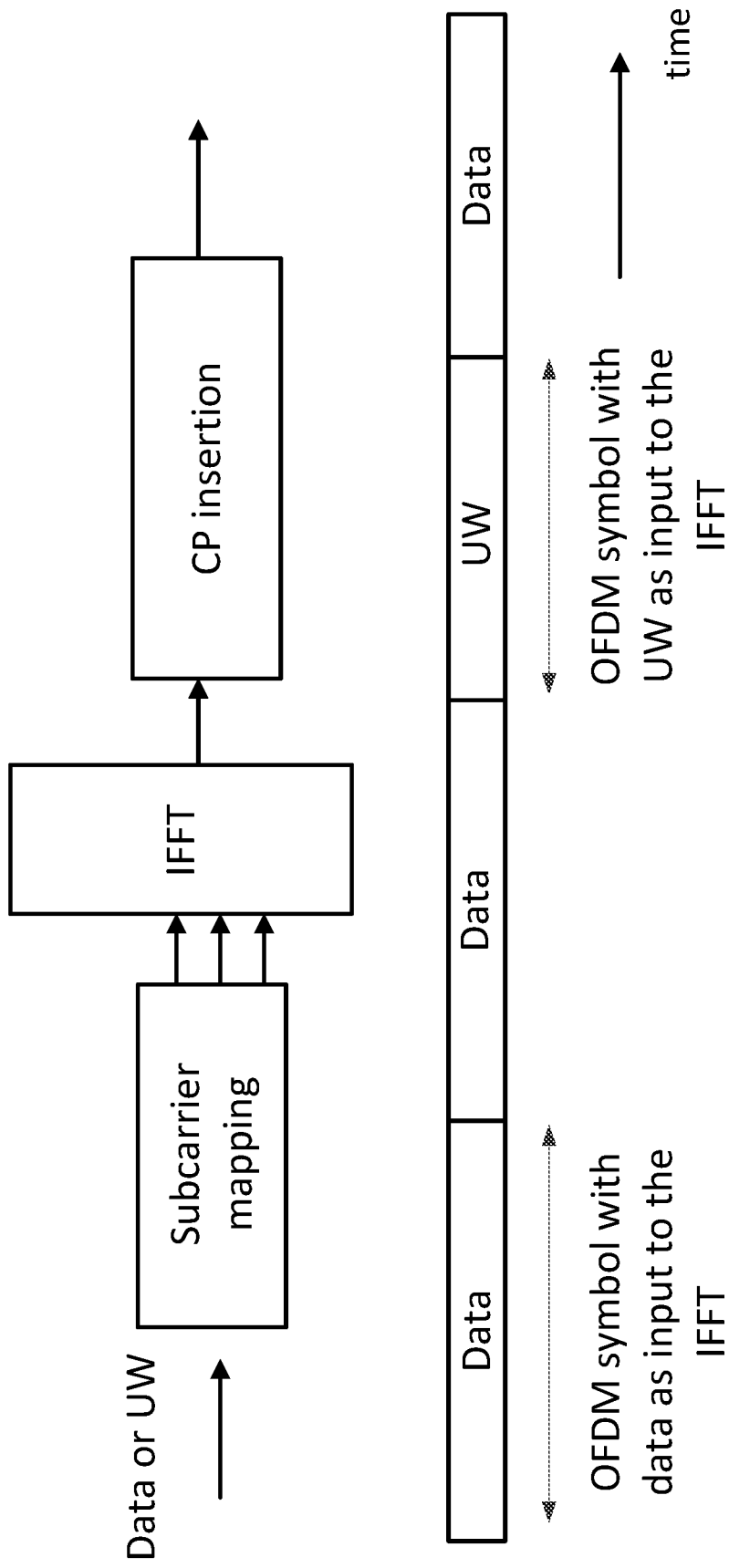
FIG. 5 is an example of time multiplexing a unique word (UW) and data signals.

FIG. 5 is an example of time multiplexing UW and data. A UW may be mapped to a first set of one or more subcarriers with a center frequency $F_c$. The UW may be denoted as $w_o(n)$ in the time domain. The locations of the UW in the time domain, e.g., the indices of the OFDM symbols generated with the UW as an input, may be configured and controlled by a central controller. If the same UW is mapped to a second set of one or more subcarriers with a center frequency $F_o$, the UW may be described, for example, according to Equation 9 below.

$$w_1(n) = w_o(n) \exp(j2\pi n(F_o F_c)/N) \qquad \text{Eq. 9}$$

A WTRU may be configured with a list of possible transmission resources and parameters when the WTRU is initially connected to a network. The resources may include one or more subcarriers, one or more time periods (e.g., subframes), transmission power, a WTRU identifier or a method to determine a WTRU identifier, etc. The WTRU may choose (e.g., autonomously choose) transmission resources and parameters from the list when the WTRU has data to transmit. The WTRU may re-transmit a packet after waiting for a specific duration of time. For example, the WTRU may re-transmit a packet when an acknowledgment is not received within a specified amount of time following a previous transmission of the packet. The WTRU may use new or modified parameters such as new or modified time/frequency resources, new or modified UW, etc. in a new transmission or in a retransmission.

Timing alignment of multiple signals may be provided at a receiver. For instance, multiple WTRUs may transmit on the same resource elements (e.g., subcarriers) using one or more multiple access technique. Certain multiple access techniques may be designed such that signals transmitted by the WTRUs may arrive at a receiver synchronously (e.g., for the receiver to be able to detect and decode the signals such as data bits included in the signals). Certain multiple access techniques (e.g., waveforms such as OFDM) may tolerate a timing offset, for example, due to the use of a cyclic prefix.

Figure 6:
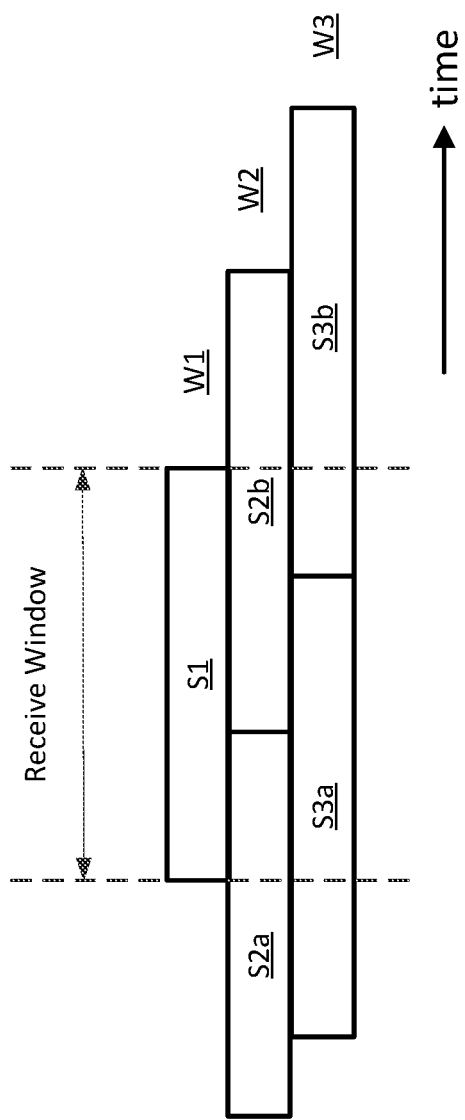
FIG. 6 is an example of a receive window for asynchronous transmission with timing offsets.

FIG. 6 shows an example of a receive window along a time axis within which asynchronous transmissions with timing offsets may be received and processed at a receiver. More specifically, multiple WTRUs may transmit signals using an OFDM waveform. The signals may arrive at a receiver (e.g., a base station) within a particular receive window. The receiver may include an FFT block configured to process the signals (e.g., after one or more portions of the signals corresponding to a cyclic prefix have been discarded). To further illustrate, a first WTRU, W1, may transmit an OFDM symbol, S1, the timing of which may be aligned with the receive window. A second WTRU, W2, may transmit consecutive OFDM symbols S2a and S2b, the timing of which may extend beyond the receive window (e.g., OFDM symbols S2a and S2b may each include a portion that falls within the receive window). A third WTRU, W3, may transmit consecutive OFDM symbols S3a and S3b, the timing of which may extend beyond the receive window (e.g., OFDM symbols S3a and S3b may each include a portion that falls within the receive window). Such timing misalignment may impact (e.g., may destroy) the orthogonality of the OFDM symbols, and may create interference among the multiple WTRUs. The interference may make it difficult for the receiver to detect data transmitted by the multiple WTRUs (e.g., W1, W2, and W3) when the data are transmitted using the same time/frequency resources.

WTRUs and/or receivers may be configured to reduce multiuser interference and/or to align multiple symbols at the receivers. In an example, there may be K WTRUs transmitting on the same time/frequency resources. A receiver of the transmissions may be configured to create a receive window that is aligned with one or more signals transmitted by one of the WTRUs, e.g., WTRU k. The receiver may be further configured to reduce interferences caused by signals transmitted by the other WTRUs. The receiver may perform the interference reduction operation for one or more of the other WTRUs (e.g., for each of the WTRUs 1 to K). The receiver may assemble the signals after interference reduction and further process the signals, for example through FFT processing, multiuser detection, etc.).

Interference among multiple WTRUs may be reduced by using multiple channels for transmission. The multiple channels may be created, for example, by utilizing multiple transmit and/or receive antennas. In an example, there may be L receive antennas at a receiver and one transmit antenna at each WTRU. For subcarrier k and user i, a received signal after FFT operations at the receiver may be described, for example, according to Equation 10 below.

$$y_{ik} = h_{ik} x_{ik} + \text{noise} + ICI_j, j \neq i \qquad \text{Eq. 10}$$

$h_{ik}$ may represent a channel for subcarrier k and user i. $x_{ik}$ may represent a data symbol for subcarrier k and user i. The received signal $y_{ik}$ may include an inter-carrier interference component, as presented $ICI_j$. Such inter-carrier interference may be caused by multiple WTRUs transmitting on the same group of allocated subcarriers, for example.

A receiver may include multiple antennas. The receiver may be configured to employ a combining technique such as maximum ratio combining to combine signals received by the multiple antennas. The output of the combining operation may be described, for example, according to Equation 11 below, where $h_{ik}^H$ may present the Hermitian of channel $h_{ik}$ (e.g., for subcarrier k and user i).

$$r = \frac{h_{ik}^H}{|h_{ik}^H|} y_{ik} = \frac{h_{ik}^H}{|h_{ik}^H|} h_{ik} x_{ik} + \frac{h_{ik}^H}{|h_{ik}^H|} \text{noise} + \frac{h_{ik}^H}{|h_{ik}^H|} ICI_j \qquad \text{Eq. 11}$$

The magnitude of the second and third terms in Eq. 11 may decrease as the number of antennas increases, which may result in reduction of inter-carrier interference. As such, massive MIMO (e.g., where the number of receive antennas may be very large) may substantially reduce interferences among multiple WTRUs.

In some scenarios (e.g., when the number of receive and/or transmit antennas may not be large enough to reduce interferences among multiple WTRUs), WTRUs may be configured to create different channels for transmission. For example, the WTRUs may be configured to transmit the same data over different time/frequency resources, and a receiver may be capable of reducing interferences among the WTRUs when the number of channels used for transmission is sufficiently high.

Figure 7:
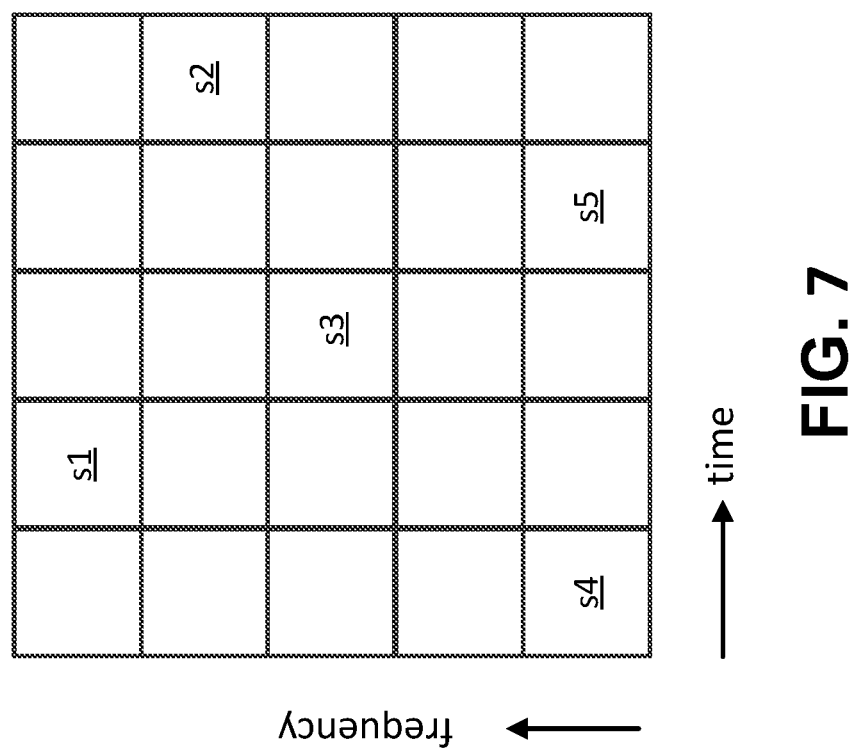
FIG. 7 is an example of transmitting data on different time/frequency resources.

FIG. 7 is an example of transmitting data on different time/frequency resources. More specifically, FIG. 7 shows an example of a sample group hopping pattern. Each square in the figure may denote a time/frequency resource, such as an OFDM symbol or a group of subcarriers. Multiple WTRUs may transmit on the same time/frequency resources. For example, multiple WTRUs may transmit data using resources indicated by squares s1, s2, s3, s4, s5. Although squares s1-s5 are used in the example, it will be appreciated that the WTRUs may transmit data using resources represented by any combination of squares shown in FIG. 7, and the resource squares may form any pattern. The pattern may be referred to herein as a group hopping pattern, and may be defined as a contention resource.

UL power control examples may be provided, e.g., using NOMA as a non-limiting example of a use case, and subframes and TTIs as non-limiting examples of a time period. A power offset may be utilized to enable dynamic control of the transmission power of a WTRU, e.g., on a transmission by transmission basis. The power offset may be used to increase or decrease transmission power associated with one or more transmissions that use the same resources. The power offset may assist with distinguishing a first one of the transmissions from a second one of the transmissions. The power offset may be utilized to enable power domain NOMA at a receiver (e.g., an eNB).

A WTRU may be configured to apply a power offset to a transmission (e.g., in the UL). The WTRU may apply the power offset in a subframe in which NOMA may be used (e.g., the WTRU be configured to may apply the power offset to a NOMA part of the transmission). The WTRU may decide not to apply a power offset in a subframe in which NOMA is not used (e.g., the WTRU may be configured to not apply the power offset to a non-NOMA part of the transmission). A power offset may be positive or negative. In other words, a WTRU may add or subtract a power offset from a transmission power. One or more power offsets may be provided (e.g., configured by a network component such as an eNB) and/or used (e.g., by a WTRU). For example, an eNB may be configured to provide the one or more power offsets through higher layer signaling or dynamic signaling. The one or more power offsets may be received by a WTRU from the eNB.

A network component (e.g., an eNB) may provide an indication to a WTRU to apply NOMA and/or a power offset. For example, the network component may indicate to the WTRU, via physical layer signaling, whether NOMA and/or a power offset is to be used for a transmission or a plurality of transmissions. The indication may include information regarding which power offset of a set of power offsets is to be used by the WTRU. The set of power offsets may be configured or otherwise known by the WTRU.

There may be one or more NOMA types including, for example, power domain NOMA or code domain NOMA. The NOMA type to be used may be provided (e.g., by a network component such as an eNB) and/or received by a WTRU. For example, an indication to use NOMA may include an indication to use a specific NOMA type. Alternatively, an indication to use a specific NOMA type may be provided separately from an indication to use NOMA. The physical layer signaling described herein may be provided via a DL control channel, DL control information (DCI), a grant such as a UL grant or a DL grant, and/or the like.

A WTRU may receive one or more indications such as explicit indications to use NOMA and/or a power offset for a transmission. The one or more indications may further indicate a specific NOMA type to use. The WTRU may receive the one or more indications via dynamic signaling (e.g., as part of DCI) from a network (e.g., an eNB). The dynamic signaling may grant resources for a transmission. Upon receiving an indication to apply a power offset, the WTRU may apply the power offset in power calculation or determination for a transmission for which resources are granted. The one or more indications may include an index. The index may represent a power offset among a set of power offsets that may have been configured or otherwise known to the WTRU. The WTRU may select and/or apply the power offset based on the indicated index.

A WTRU may receive an indication of which bits of the constellation the WTRU may use for transmission (e.g., least significant bits (LSBs) and/or most significant bits (MSBs)). The indication may be provided in a UL grant. The WTRU may perform transmissions in accordance with the indication. The WTRU may be configured to interpret an indication to transmit on the LSBs and/or MSBs as an indication to perform NOMA transmissions or a particular type of NOMA transmissions. The WTRU may be further configured to apply a power offset for NOMA transmissions and/or a particular type of NOMA transmissions.

A WTRU may be configured to apply a power offset if (e.g., only if) the WTRU receives an indication to transmit on the MSBs. A WTRU may be configured to apply a power offset if (e.g., only if) the WTRU receives an indication to transmit on the LSBs. A WTRU may be configured to not apply a power offset if the WTRU receives an indication to transmit on the LSBs or MSBs. A WTRU may be configured to not apply a power offset such as a NOMA power offset if the WTRU receives an indication to transmit on both sets of bits (e.g., LSBs and MSBs).

A WTRU may be configured to apply a power offset for (e.g., only for) one or more NOMA types (e.g., such as power domain NOMA). A WTRU may be configured to not apply a power offset for one or more NOMA types (e.g., such as code domain NOMA). A WTRU may be configured to apply different power offsets based on NOMA types. For example, a WTRU may be configured to apply a first power offset for a first NOMA type and a second power offset for a second NOMA type.

A WTRU may be configured to not apply a power offset such as a NOMA power offset for a UL transmission for which NOMA or a particular type of NOMA is not indicated. A WTRU may be configured to not apply a power offset such as a NOMA power offset for a UL transmission for which NOMA or a particular type of NOMA is indicated as not to be used. The indication to not use NOMA or a particular type of NOMA may be provided in a grant for the UL transmission.

A WTRU may be configured to not apply a power offset to a UL transmission for which no power offset is indicated. A WTRU may be configured to not apply a power offset for a UL transmission for which a power offset is indicated as not to be used. The indication to not use a power offset may be provided in a grant for the UL transmission.

Application of a power offset may be activated, for example on a transmission by transmission basis. For example, an indication to apply NOMA, a NOMA type, and/or a power offset may be associated with a specific transmission. A WTRU may be configured to apply NOMA, a NOMA type, and/or a power offset only to that specific transmission. As such, a WTRU may apply a power offset for a first transmission and not for a second transmission. The first and second transmissions may be on the same channel. The second transmission may be a later transmission than the first transmission (e.g., the second transmission may be the very next transmission after the first transmission). The first and second transmissions may be on the same carrier. A WTRU may apply a power offset for a particular transmission or a particular set of transmissions. A WTRU may remove a power offset (e.g., not apply the power offset) for a subsequent transmission or a subsequent set of transmissions after applying the power offset for a first transmission or a first set of transmissions.

A WTRU may receive an activation indication regarding when to start applying NOMA, a NOMA type, and/or a power offset. The WTRU may receive the activation indication in physical layer signaling. The WTRU may receive the activation indication in MAC layer signaling, such as in a MAC control element (MAC-CE). The activation indication may include a starting time period for applying NOMA, a NOMA type, and/or a power offset. Upon receiving the activation indication, the WTRU may begin applying NOMA, a NOMA type, and/or a power offset at the starting time period. In an example, the WTRU may beginning applying NOMA, a NOMA type, and/or a power offset with an UL transmission that is at least k time periods after the time period in which the activation was received. The value of k may be configurable (e.g., k may be configured to have an integer value such as 0, 1, 4, etc.). In an example, the WTRU may begin applying NOMA, a NOMA type, and/or a power offset with the UL transmission for which a grant or other physical layer signaling that includes the activation was received.

A WTRU may apply NOMA, a NOMA type, and/or a power offset for a time period, for a set of time periods, or until an indication to stop NOMA, the NOMA type, or the power offset is received. A WTRU may receive the duration or number of time periods for which NOMA, a NOMA type, and/or a power offset is to be applied via physical layer signaling or higher layer signaling. A WTRU may receive an indication to stop (e.g., to deactivate) NOMA, a NOMA type, and/or a power offset via physical layer signaling or MAC layer signaling such as in a MAC-CE. A WTRU may stop applying NOMA, a NOMA type, and/or a power offset within m time periods (e.g., no more than m time periods) after the time period in which the WTRU received an indication to stop or deactivate NOMA, the NOMA type, and/or the power offset. The value of m may be configurable (e.g., m may be configured to have an integer value such as 0, 1, 4, etc.).

A WTRU's maximum transmit power may be constrained. A WTRU that applies a power offset such as a NOMA power offset may comply with one or more maximum power constraints. For example, a WTRU's channel power (e.g., with or without a power offset) may be limited by a maximum carrier power. A WTRU's overall power (e.g., with or without a power offset) may be limited by a maximum WTRU output power.

A WTRU may determine its channel power based on one or more of Equations 12, 13, 14 and 15 shown below. A WTRU may limit the sum of its channel powers (e.g., including channel carrier power $Pchan_{,c}$) to Pcmax. According to Equation 12, a WTRU may apply a power offset in the determination of channel power that may include an open and/or closed loop component. According to Equation 13, a WTRU may apply a power offset in the determination of channel power for a specific carrier (e.g., denoted as $Pchan_{,c}$). According to Equation 14, a WTRU may set a channel power for carrier c to the smaller of a maximum power, Pcmax,c, and a calculated power that may be a function of an open loop component, a closed loop component, and/or a power offset. According to Equation 15, an offset may be applied to the determination of power for a PUSCH channel of carrier c (e.g., as shown in Eq. 4).

$$Pchan = Popenloop + Pclosedloop + Offset_{NOMA} \qquad \text{Eq. 12}$$

$$Pchan_{,c} = Popenloop_{,c} + Pclosedloop_{,c} + Offset_{NOMA,c} \qquad \text{Eq. 13}$$

$$Pchan_{,c} = \min[Pcmax, c, (Popenloop_{,c} + Pclosedloop_{,c} + Offset_{NOMA,c})] \qquad \text{Eq. 14}$$

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) + Offset_{NOMA,c} \end{cases} \qquad \text{Eq. 15}$$

A WTRU may receive an indication to use maximum power. For example, a WTRU may receive (e.g., dynamically) an indication to use maximum power for a particular transmission, such as a transmission of a particular channel. The WTRU may receive the indication, for example, in physical channel signaling such as in a UL grant. Based on the indication, the WTRU may transmit (e.g., transmit a channel) at the maximum power. The transmission may be performed, for example, using resources indicated by the associated UL grant.

A WTRU may assume that a channel indicated to be transmitted at maximum power has high priority (e.g., has the highest priority). A WTRU may drop another channel (e.g., the WTRU may drop all other channels) to transmit a channel indicated to be transmitted at maximum power.

A WTRU may treat a channel indicated to be transmitted at maximum power as a normal priority channel, and allocate power accordingly. For example, when a channel indicated to be transmitted at maximum power is not the channel with the highest priority, the WTRU may allocate power to the higher priority channel or channels first, and then allocate the remaining power (e.g., all of the remaining power) to the indicated channel.

The examples provided herein with respect to the use of maximum power may be applicable to the use of a power offset, and vice versa. For example, a WTRU may be configured to treat an indication to use constellation MSBs or LSBs for a transmission (e.g., a transmission of a channel) as an indication to transmit at maximum power.

A WTRU may switch between applying absolute TPC and applying TPC accumulation. For example, a WTRU may be configured to apply absolute TPC or TPC accumulation based on an indication that the WTRU receives (e.g., dynamically). Such an indication may be provided and/or received, for example, in physical layer signaling, such as in a UL grant. A WTRU may be configured to apply absolute TPC or TPC accumulation to transmissions for which resources are granted. A WTRU may be configured to only apply absolute TPC or TPC accumulation to transmissions for which resources are granted.

A WTRU may be configured to apply TPC accumulation in one or more subframes. In those subframes, the WTRU may apply an indicated TPC adjustment to a TPC accumulator, and the WTRU may use the TPC accumulator power calculation. A WTRU may be configured to apply absolute TPC in one or more subframes. In those subframes, the WTRU may use an indicated TPC value instead of a TPC accumulator in power calculation. The WTRU may continue to maintain a TPC accumulator in subframes in which absolute TPC is to be used. The WTRU may not adjust the TPC accumulator in those subframes. For example, the WTRU may save the state of the TPC accumulator in those subframes, and may switch to using the saved TPC accumulator when receiving an indication later to use the TPC accumulator.

Frequency hopping may be used in transmission (e.g., uplink transmission), for example, to achieve frequency diversity. Parts of a codeblock may be transmitted on different parts of a channel bandwidth when frequency hopping is used. For example, a portion (e.g., a first half) of the bits in a codeblock may be transmitted on a subset of subcarriers in a first part of a time period. The subset of subcarriers may include, for example, subcarriers 1 to K1 or subcarriers K1 to K2, where K1 and K2 may be integers. The first part of the timer period may be, for example, a first slot of a subframe. Similarly, a second part (e.g. a second half) of the bits in the codeblock may be transmitted on a second subset of subcarriers. Such a second subset of subcarriers may include, for example, subcarriers K1 to K2, subcarriers K2 to K3, subcarriers K1+1 to N, or subcarriers N−K1+1 to N, where K1, K2, K3, and N may be integers. N may be the total number of subcarriers in a channel.

A hopping pattern for a specific transmission may be configured (e.g., explicitly configured) and/or signaled. The configuration and/or signaling may be provided by a central controller such as a base station, for example. A hopping pattern may identify and/or may be used to determine a subset of subcarriers that may be transmitted in a time period, in a part of a time period, in a set of time periods, and/or in one or more parts of a set of time period parts.

Figure 8:
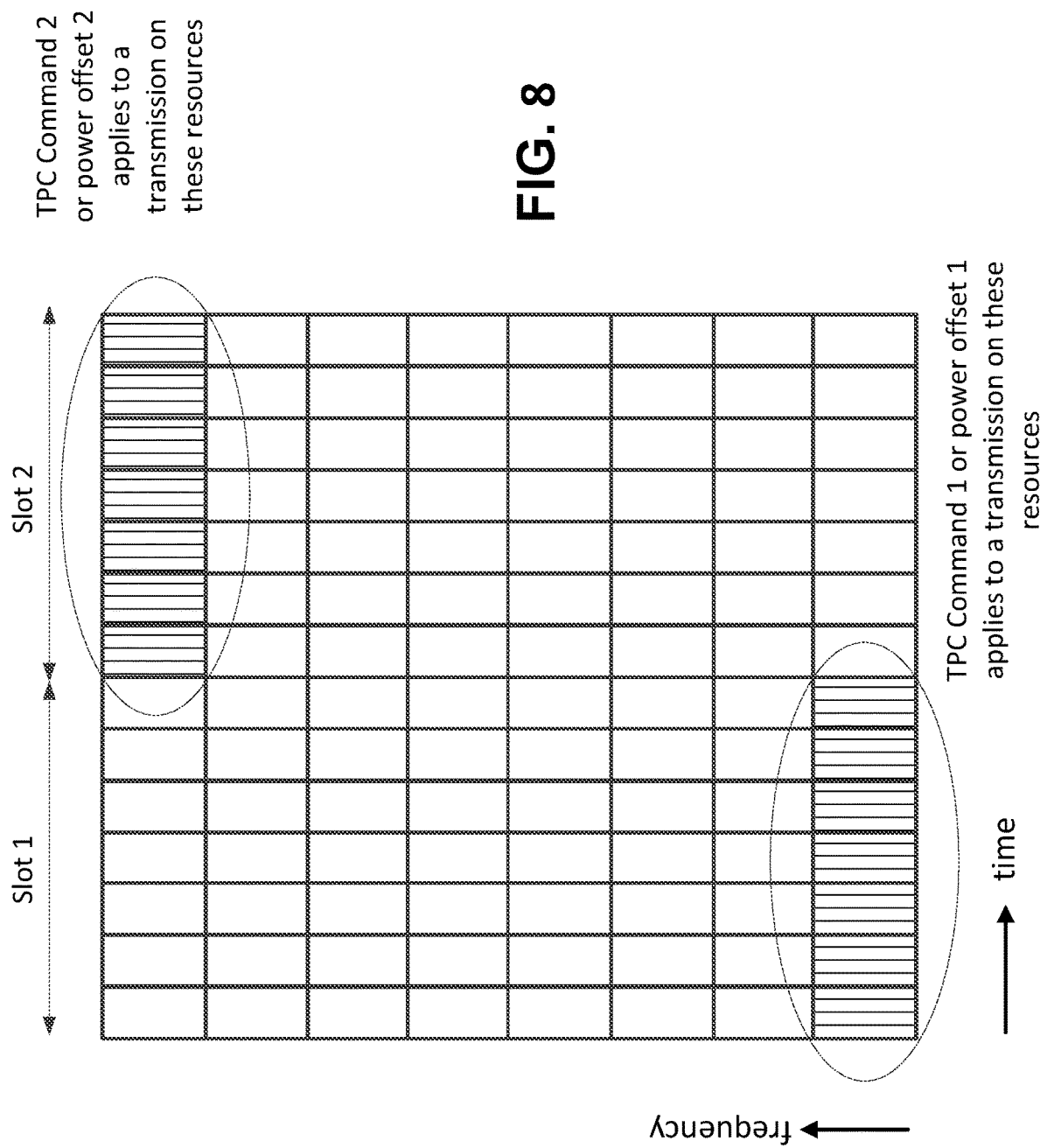
FIG. 8 is an example of power control with frequency hopping.

FIG. 8 is an example of power control with frequency hopping. As shown, a rectangle may denote a symbol in the time domain (e.g., an OFDM or DFT-s-OFDM symbol) and/or a set of subcarriers in the frequency domain. A set of subcarriers as referred to herein may include one or more subcarriers. A set of subcarriers may include a subset of the subcarriers in a channel bandwidth. A time period may include a subframe. A subframe may include two slots (e.g., two timeslots). A timeslot may include seven symbols. Subcarriers at opposite ends of a channel bandwidth may be used for data transmission. Hopping as described herein may be from one end of the bandwidth to the other end of the bandwidth.

Separate power control and/or power control commands may be provided and/or used for parts of a codeblock when frequency hopping is used. The parts of the codeblock may be mapped to different subsets of subcarriers. For example, a separate TPC command and/or power offset may be provided and/or used for a first part and a second part of a codeblock that may be respectively mapped to subcarriers in a first and a second part of a time period.

In an example (e.g., such as the example shown in FIG. 8), TPC command 1 and/or power offset 1 may apply to transmission of a first half of a codeblock in a first slot. TPC command 2 and/or power offset 2 may apply to a second half of the codeblock in a second slot. A WTRU may determine (e.g., independently) the transmit power for a first part and/or second part of a codeblock, for example, based on the corresponding TPC value and/or power offset.

Transmit power for a first and/or second part of a codeblock may be determined based on at least one of the following. The transmit power may be determined based on a first TPC value, which may correspond to or be indicated for a first codeblock. The transmit power may be determined based on a second TPC value, which may correspond to or be indicated for a second codeblock. The transmit power may be determined based on a first power offset, which may correspond to or be indicated for a first codeblock. The transmit power may be determined based on a second power offset, which may correspond to or be indicated for a second codeblock. For example, a transmit power for a first part of a codeblock may be determined based on a first power offset and a transmit power of a second part of a codeblock may be determined based on a first power offset and a second power offset such as a sum of the first power offset and the second power offset.

A first part of a codeblock and a second part of a codeblock may be transmitted in separate parts of a time period. For example, a first and second parts of a codeblock may be transmitted in separate symbols or slots of a subframe. A first part of a codeblock and a second part of a codeblock may be transmitted in separate parts of a frequency span (e.g., channel bandwidth) when frequency hopping is used. The separate parts of the frequency span may include separate sets or subsets of subcarriers, for example. The second parts of the frequency span may be overlapping, non-overlapping, or partially non-overlapping.

Frequency hopping power control may be provided for NOMA. A WTRU may be configured to perform open loop and/or closed loop power control at a partial codeblock level. For example, a WTRU may be configured to perform open loop and/or closed loop power control at a time level at which a codeblock may be split (e.g., in time) and/or may hop (e.g., in frequency). A partial codeblock may be a part of a codeblock.

A WTRU may be configured to perform open loop and/or closed loop power control for half a codeblock, for example, when resources may be provided and/or used at a half codeblock level. A WTRU may be configured to perform open loop and/or closed loop power control at a timeslot level, for example, when frequency hopping may be among timeslots.

A WTRU may be configured to perform at least one of the following at a partial codeblock level or at a time level at which a codeblock may be split (e.g., in time) and/or may hop (e.g., in frequency). The WTRU may be configured to apply accumulation of TPC commands or to apply TPC command values and/or offsets. The WTRU may be configured to perform power calculation, determination, and/or application. The WTRU may be configured to perform maximum power determination. The WTRU may be configured to apply rules (e.g., scaling rules) to avoid exceeding maximum power. The WTRU may be configured to apply NOMA, such as according to one or more examples described herein. The WTRU may be configured to apply a power offset (e.g., for NOMA). The WTRU may be configured to apply a TPC command value or offset such as to adjust power based on or in accordance with the TPC command value or offset. The WTRU may be configured to switch between using a TPC value and TPC accumulation in the calculation and/or determination of power.

A WTRU may receive a command (e.g., a TPC command), an offset (e.g., a power offset), and/or an indication (e.g., a NOMA indication or an indication to use a power offset). The command, offset, and/or indication may be provided at a codeblock level (e.g., for a codeblock or set of codeblocks) or at a time level (e.g., for a time period or set of time periods) over which a codeblock may be split and/or may hop. For example, a WTRU may receive a command (e.g., a TPC Command), an offset (e.g., power offset), and/or an indication (e.g., a NOMA indication or an indication to use a power offset) at a partial codeblock level or at a time level at which a codeblock may be split (e.g., in time) and/or may hop (e.g., in frequency).

A WTRU may receive one or more commands (e.g., command values or command offsets), one or more offsets (e.g., power offsets), and/or one or more indications at a codeblock level or at a time level over which a codeblock may be split and/or may hop. For example, a WTRU may receive x number of commands, offsets, and/or indications when a codeblock is split in x parts. A command, an offset, and/or an indication may be for or may apply to a partial codeblock.

A WTRU may receive at least one of the following for a partial codeblock or for a time period at which a codeblock may be split (e.g., in time) and/or may hop (e.g., in frequency). The WTRU may receive a TPC command. The WTRU may receive a power offset (e.g., for NOMA). The WTRU may receive an indication to use a power offset. The WTRU may receive a NOMA indication. The WTRU may receive an activation indication, a duration, or a stop indication for using NOMA or a power offset. The WTRU may receive an indication to switch between using a TPC value and using TPC accumulation.

A WTRU may apply at least one of the following at a partial codeblock level or at a time level at which a codeblock may be split (e.g., in time) and/or may hop (e.g., in frequency). The WTRU may apply a TPC command. The WTRU may apply a power offset (e.g., for NOMA), for example based on an indication to use the power offset. The WTRU may apply NOMA (e.g., based on a NOMA indication). The WTRU may activate (e.g., based on an activation indication), maintain (e.g., based on a duration indication), or stop (e.g., based on a stop indication) NOMA or a power offset. The WTRU may switch between using a TPC value and using TPC accumulation.

A TPC command may be provided and/or used for a part of a codeblock. For example, a first TPC command may be provided and/or used for a first part of a codeblock and a second TPC command may be provided and/or used for a second part of the codeblock. A TPC command may provide a value or an offset (e.g., increment or decrement) for a part of a codeblock. A WTRU may accumulate TPC commands for a part of a codeblock.

A WTRU may use a TPC command value or an accumulation of TPC command offsets to calculate and/or determine a transmission power for a part of a codeblock. The WTRU may perform the foregoing operation as part of a closed loop component of power control. For example, the WTRU may use a first TPC command value or offset for a first codeblock to calculate and/or determine a transmission power for the first codeblock. The WTRU may use a second TPC command value or offset for a second codeblock to calculate and/or determine a transmission power for the second codeblock.

A TPC command may provide a TPC command value or a TPC command offset (e.g., an increment or decrement) for one or more parts of a codeblock. For example, a TPC command may provide a first TPC value or TPC offset for a first part of a codeblock and a second TPC value or TPC offset for a second part of the codeblock. A power offset (e.g., for NOMA) may be applied to a part of a codeblock. For example, a first power offset may be provided and/or used for a first part of a codeblock and a second power offset may be provided and/or used for a second part of the codeblock. A WTRU may use a power offset in the calculation or determination of transmission power for part of a codeblock. For example, a WTRU may use a first power offset configured for a first codeblock to calculate and/or determine a transmission power for the first codeblock. The WTRU may use a second power offset configured for a second codeblock to calculate and/or determine a transmission power for the second codeblock.

A WTRU may be configured to apply autonomous power control, e.g., for grant-less transmissions. Grant-less transmissions may refer to transmissions by a WTRU without a grant from a central controller such as a base station. Such grant-less transmissions may be performed using NOMA techniques, for example. The term central controller may refer to a base station, an access point, a network node, and/or other entity that may provide configuration, control, scheduling, and/or synchronization signals or information.

A WTRU may choose one or more transmission parameters when a grant is not provided. The WTRU may choose the one or more transmission parameters autonomously (e.g., without instructions or configurations from a central controller). The one or more transmission parameters may include, for example, a transmit power, time and/or frequency resources that may be used for the transmission, modulation and/or coding order that may be used for the transmission, a transport block size, and/or the like.

A WTRU may be configured with a pool or a set of time/frequency resources that may be used for transmission (e.g., such as grant-free transmission). The pool or set of time/frequency resources may be referred to a resource pool. The term "time/frequency" may be used to represent time and/or frequency.

Figure 9:
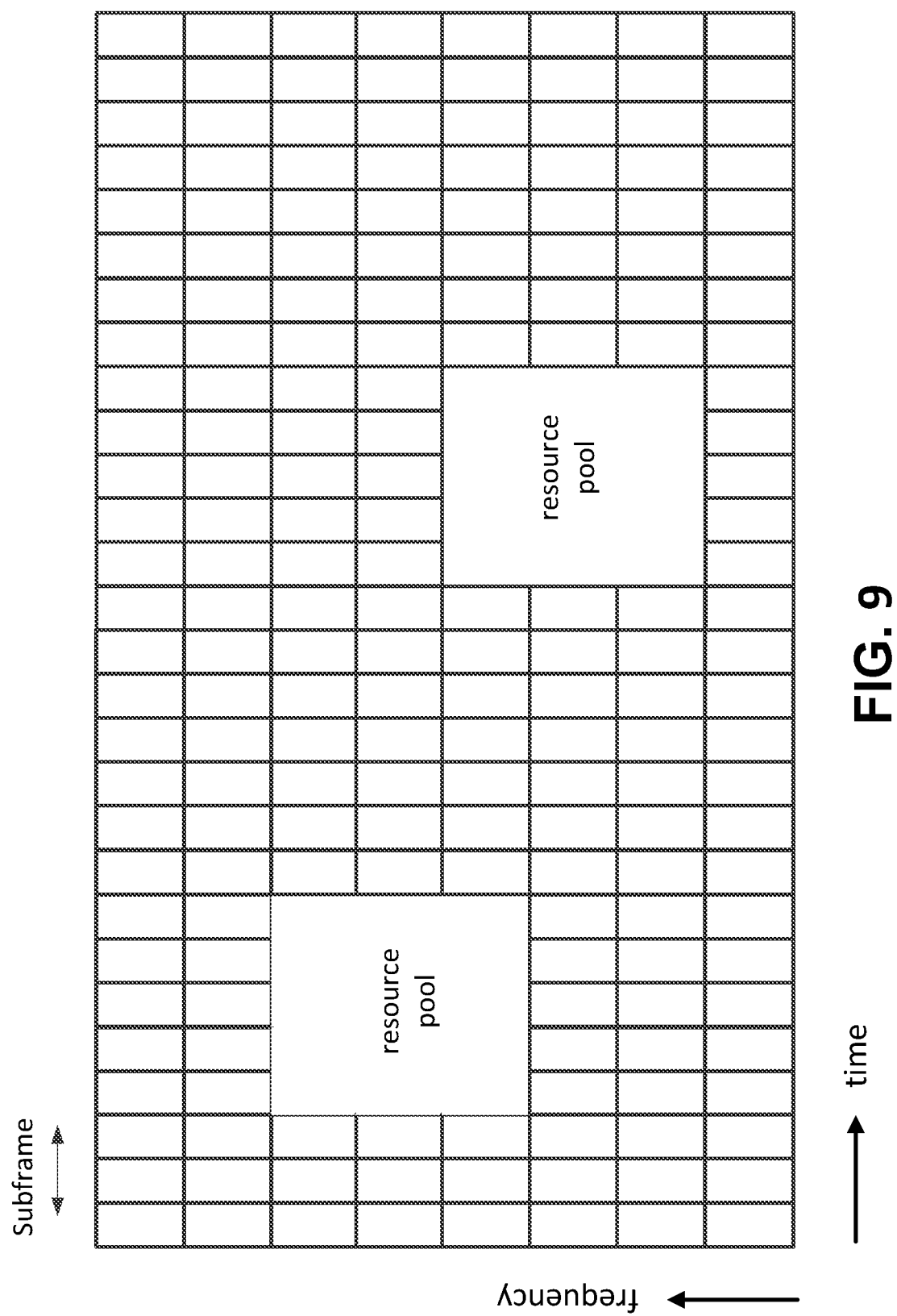
FIG. 9 is an example of resource pools for grant-free transmission.

FIG. 9 shows examples of resource pools in terms of time/frequency for grant-free transmissions. A WTRU may be configured with one or more resource pools. The WTRU may use resources in one or more of the configured resource pool(s) for transmission. Multiple WTRUs may be configured with the same resource pool(s), for example, when NOMA is used in a system. Resources utilized for transmission may depend on the amount of data to be transmitted.

Different WTRUs that may be transmitting on the same time/frequency resources may be configured to have different received SINR and/or coding/modulation orders or schemes, for example, when using power domain NOMA. The differences may help a receiver of the transmissions separate interfering signals and/or may enable the use of SIC-based receivers. To illustrate, two WTRUs may be transmitting on the same time/frequency resources with the same modulation and coding scheme. A received SINR of a first WTRU may differ from the received SINR of a second WTRU by +X dB or −X dB, where X may have a value of 3 or 6, for example.

Different WTRUs (e.g., which may transmit using the same time/frequency resources) may be configured to use different coding rates. For example, a coding rate of a first WTRU may be higher or lower than a coding rate of a second WTRU. Different WTRUs that may transmit using the same time/frequency sources such as those from a same resource pool may determine (e.g., autonomously) one or more transmission parameters such as transmit power and/or coding rate for the transmission. The transmission may be a grant-free transmission. The transmission parameters may be determined such that SIC may be performed at a receiver.

A WTRU may determine and/or adjust a transmit power (e.g., for a UL transmission or channel) based on one or more parameters. The one or more parameters may include a path loss (e.g., between a receiver such as a base station and the WTRU) and/or a power offset. The WTRU may select the power offset randomly, as described herein. The WTRU may determine and/or measure the path loss. The WTRU may determine and/or adjust its transmit power to compensate for path loss, to provide sufficient transmit power for a desired block error rate, to include an offset such as a random offset, and/or for other purposes.

A WTRU may determine (e.g., compute) a transmission power based on one or more factors such as path loss measurements, data rate requirements, etc. The WTRU may add a random offset to the determined transmission power. The random offset may, for example, reduce the probability that received signal-to-interference-plus-noise ratios (SINRs) of a first WTRU and a second WTRU that may transmit simultaneously using a same resource pool are the same.

A WTRU may select a random offset within a range that may be configured, for example, by a central controller (e.g., a base station). The range may be, for example, −3 to +3, and may be specified in various units such as dB. Different ranges may be provided for different WTRUs. A WTRU may choose a random offset that may not violate a maximum transmit power constraint of the WTRU. The WTRU may use the maximum transmit power as the transmit power when the addition of a random offset will cause violation of the maximum transmit power constraint (e.g., such as when the power value after addition of the offset may be higher than the maximum transmit power).

A WTRU may apply a same power offset (e.g., a random offset) to the whole duration of a transmission or apply different power offsets to different portions of a transmission (e.g., to different intervals of the duration of the transmission). For example, a transmission may last N subframes. A subframe may include two slots. A slot may include M symbols such as M OFDM or DFT-s-OFDM symbols. A WTRU may apply a same power offset (e.g., a random offset) to one or more (e.g., some or all) of the N subframes. A WTRU may apply different (e.g., randomly selected) power offsets to different subframes of the N subframes. A WTRU may apply different (e.g., randomly selected) power offsets to different slots in a subframe, to different symbols in a subframe, or to different groups of symbols in a subframe.

A network (e.g., a base station) may configure one or more of the following parameters, and a WTRU may select and/or apply a parameter from the one or more parameters configured by the network. The WTRU may select and/or determine one or more of the following parameters autonomously. The one or more parameters may include, for example, a power offset value range, a power offset value (e.g., a random power offset value), and/or one or more parts of a transmission to which a power offset may be applied. For example, the parameters may specify that a power offset is to be applied to the whole duration of a transmission, to specific subframes, slots, and/or symbols of a transmission, to one or more NOMA parts of the transmission but not to a non-NOMA part of the transmission, etc.

A central controller (e.g., a base station) may configure (e.g., provide) a range of power offset values for a WTRU to select. The range of values may be, for example, −X to +X dB, wherein the value of X may be configurable. A WTRU may select a power offset randomly from the configured value range, and may apply the randomly selected power offset to a transmission power. The WTRU may apply the randomly selected power offset to the whole duration of a transmission. The WTRU may be configured to apply the randomly selected power offset to a part of a transmission. For example, the WTRU may apply a power offset randomly selected from a first range (e.g., −X to +X dB) to a first set of subframes of a transmission (e.g., even-numbered subframes, and apply a power offset randomly selected from a second range (e.g., −Y to +Y dB) to a second set subframes of the transmission (e.g., odd-numbered subframes).

A WTRU may transmit and/or indicate (e.g., to a network component such as a base station) the power offset value that the WTRU has selected (e.g., randomly) and/or applied. The WTRU may, for example, transmit the value of a selected power offset in an uplink control channel. The WTRU may indicate (e.g., implicitly indicate) the value of a selected power offset, for example, by one or more reference signals transmitted by the WTRU. For example, the WTRU may transmit a reference signal using the power offset the WTRU may apply to a data transmission (e.g., a data channel) or a control transmission (e.g., a control channel). To further illustrate, if the WTRU is to apply a power offset to a subframe of a data or control transmission, the WTRU may indicate the power offset by applying the power offset to one or more reference signals that may be transmitted in the subframe.

A WTRU may apply power offset values to a transmission in accordance to a pattern. The power offset values and/or pattern may be configured by a central controller. A WTRU may autonomously select a transport block size (TBS), which may represent the number of bits before channel coding. The WTRU may select the TBS within a specified or configured range. For example, the WTRU may select a TBS from a range of M to K bits. The selected TBS may be used to determine a coding rate. As such, choosing a TBS within a range may have similar effects as choosing a coding rate within a corresponding range. A range of TBS and/or coding rate may be configured by a central controller (e.g., such as a base station). A WTRU may transmit a TBS that may be used for a transmission to a receiver of the transmission, for example in an uplink control channel.

Systems, methods, and instrumentalities have been disclosed for uplink (UL) asynchronous NOMA. Hybrid multiple access may comprise, for example, NOMA with asynchronous and/or grant-free transmissions. Data streams may be distinguished, for example, based on different power and/or resources used for transmitting the data streams. The transmission power of multiple WTRUs that may transmit on the same resources may be dynamically controlled, for example, using randomly selected power offsets. High and low power transmissions that originate from the same or different WTRUs may be grouped, for example, based on successive cancellation and/or interference alignment. Transmissions may be self-contained, and may comprise information to correctly identify and decode the transmissions. A transmission may comprise a built-in deterministic sequence (e.g., a unique word), for example to support timing acquisition at a receiver. A unique word (UW) may be group-specific or WTRU-specific. The length of a UW may be adjustable. A UW associated with a transmission may indicate a resource used by the transmission. WTRUs may be identified based on sub-carriers used for UW mapping. Power control (e.g., for NOMA) may be provided in association with frequency hopping. Autonomous power control may be provided for grant-less access (e.g., grant-less transmissions).

The processes and instrumentalities described herein may be applied in any combination, and may apply to other wireless technologies or services. A WTRU may refer to an identity of a physical device, or to a user's identity such as subscription related identities (e.g., MSISDN, SIP URI, etc.). A WTRU may refer to application-based identities such as user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), comprising: a processor configured to:
receive configuration information over a network, wherein the configuration information indicates a set of power offsets associated with uplink operation by the WTRU;
determine a transmission power associated with an uplink transmission, wherein the transmission power is determined based on at least a parameter received over the network;
adjust the transmission power, wherein the adjustment comprises applying a power offset to the transmission power based on a condition that the uplink transmission includes a non-orthogonal multiple access transmission, and wherein the power offset is randomly selected by the WTRU from the set of power offsets indicated by the configuration information; and
perform the non-orthogonal multiple access transmission using the adjusted transmission power.

2. The WTRU of claim 1, wherein the set of power offsets is indicated as a value range.

3. The WTRU of claim 1, wherein the processor is configured to apply the power offset to the transmission power based on a further condition that downlink control information (DCI) is received by the WTRU indicating that the power offset is to be applied.

4. The WTRU of claim 1, wherein the uplink transmission comprises a grant-free transmission.

5. The WTRU of claim 1, wherein the uplink transmission further comprises a second type of transmission and the processor is configured to transmit the second type of transmission using a transmission power that is different from the adjusted transmission power.

6. The WTRU of claim 5, wherein the second type of transmission comprises an orthogonal multiple access transmission.

7. The WTRU of claim 5, wherein the non-orthogonal multiple access transmission is transmitted using a first subset of subframes or slots associated with the uplink transmission and the second type of transmission is transmitted using a second subset of subframes or slots associated with the uplink transmission.

8. The WTRU of claim 5, wherein the non-orthogonal multiple access transmission is transmitted using a first subset of symbols associated with the uplink transmission and the second type transmission is transmitted using a second subset of symbols associated with the uplink transmission.

9. The WTRU of claim 1, wherein the parameter comprises a transmit power control (TPC) command.

10. A method implemented in a wireless transmit/receive unit (WTRU), the method comprising:
the WTRU receiving configuration information over a network, wherein the configuration information indicates a set of power offsets associated with uplink operation by the WTRU;
the WTRU determining a transmission power associated with an uplink transmission, wherein the transmission power is determined based on at least a parameter received over the network;
the WTRU adjusting the transmission power, wherein the adjustment comprises the WTRU applying a power offset to the transmission power based on a condition that the uplink transmission comprises a non-orthogonal multiple access transmission, and wherein the power offset is randomly selected by the WTRU from the set of power offsets indicated by the configuration information; and
the WTRU performing the non-orthogonal multiple access transmission using the adjusted transmission power.

11. The method of claim 10, wherein the set of power offsets is indicated as a value range.

12. The method of claim 10, wherein the power offset is applied to the transmission power based on a further condition that downlink control information (DCI) is received by the WTRU indicating that the power offset is to be applied.

13. The method of claim 10, wherein the uplink transmission comprises a grant-free transmission.

14. The method of claim 10, wherein the uplink transmission further comprises a second type of transmission and the method further comprises transmitting the second type of transmission using a transmission power that is different than the adjusted transmission power.

15. The method of claim 14, wherein the second type of transmission comprises an orthogonal multiple access transmission.

16. The method of claim 14, wherein the non-orthogonal multiple access transmission is transmitted using a first subset of subframes or slots associated with the uplink transmission and the second type of transmission is transmitted using a second subset of subframes or slots associated with the uplink transmission.

17. The method of claim 14, wherein the non-orthogonal multiple access transmission is transmitted using a first subset of symbols associated with the uplink transmission and the second type of transmission is transmitted using a second subset of symbols associated with the uplink transmission.

18. The method of claim 10, wherein the parameter comprises a transmit power control (TPC) command.

* * * * *